United States Patent [19]

Demmel

[11] Patent Number: 5,288,739

[45] Date of Patent: * Feb. 22, 1994

[54] PRODUCTION OF ATTRITION-RESISTANT CATALYST BINDERS THROUGH USE OF DELAMINATED CLAY

[76] Inventor: Edward J. Demmel, 1931 Port Claridge, Newport Beach, Calif. 92660

[*] Notice: The portion of the term of this patent subsequent to Mar. 2, 2010 has been disclaimed.

[21] Appl. No.: 24,688

[22] Filed: Mar. 1, 1993

Related U.S. Application Data

[63] Continuation-in-part of Ser. No. 893,921, Jun. 4, 1992, Pat. No. 5,190,902.

[51] Int. Cl.$^5$ .......................... B01J 20/12; B01J 21/16; B01J 29/06
[52] U.S. Cl. .......................... 502/63; 502/68; 502/80
[58] Field of Search .............. 502/61, 63, 68, 80, 502/81, 86; 208/114

[56] References Cited

U.S. PATENT DOCUMENTS

| | | | |
|---|---|---|---|
| 2,377,093 | 5/1945 | McGrew | 208/114 |
| 2,531,427 | 11/1950 | Hauser | 260/448 |
| 2,848,423 | 8/1958 | Mills | 252/449 |
| 2,921,018 | 1/1960 | Helmers et al. | 208/114 |
| 2,966,506 | 12/1960 | Jordan | 260/448 |
| 3,044,954 | 7/1962 | Hirschler | 208/114 |
| 4,471,070 | 9/1984 | Siefert et al. | 502/302 |
| 4,594,332 | 6/1986 | Hoelderick | 502/64 |
| 4,728,635 | 3/1988 | Bhattacharyja et al. | 502/304 |
| 4,873,211 | 10/1989 | Walker et al. | 502/64 |
| 5,110,776 | 5/1992 | Chitnis et al. | 502/60 |
| 5,126,298 | 6/1992 | Absil et al. | 502/68 |
| 5,173,463 | 12/1992 | Macedo | 502/63 |

Primary Examiner—Carl F. Dees
Attorney, Agent, or Firm—Dorr, Carson, Sloan & Peterson

[57] ABSTRACT

Attrition-resistant binders can be prepared by a process wherein a slurry of delaminated and calcined clay particles is brought to either a low pH level (e.g., 1.0 to 3.0) or to a high pH level (e.g., 14.0 to 10.0) and mixed with a phosphate-containing compound in a concentration of from about 2.0 to about 20.0 weight percent. Preferably, the resulting slurry is spray dried and the particulate products of the spray drying are then calcined to produce attrition-resistant binder particles.

108 Claims, 1 Drawing Sheet

PRODUCTION OF ATTRITION-RESISTANT CATALYST BINDERS THROUGH USE OF DELAMINATED CLAY

BACKGROUND OF THE INVENTION

1. Related Applications

This patent application is a continuation-in-part application of my co-pending U.S. patent application Ser. No. 893,921 filed Jun. 4, 1992 entitled "Method For Producing Attrition-Resistant Catalyst Binders" which issued as U.S. Pat. No. 5,190,902 on Mar. 2, 1993.

2. Field of the Invention

This invention is generally concerned with the production of attrition-resistant binder formulations such as those used to bind catalyst particles into those forms (e.g., microspheroids) which are commonly employed in fluid catalytic cracking processes. More particularly, this invention is concerned with the use of certain inexpensive, naturally occurring clay materials, e.g., kaolinites—in place of certain more expensive, synthetic materials, e.g., synthetic silica and/or alumina materials—as principle ingredients in such binder formulations.

3. Description of the Prior Art

Clays have been used in catalyst matrix systems for many years. For example, one very important development in petroleum "cracking" was the catalytic decomposition of gas oil in the presence of certain naturally occurring clays such as kaolinites in an atmosphere of the gas oil's own vapor. However, the use of such clays as catalysts per se has diminished over the years. There were several reasons for this. One of the most important of these reasons was the fact that most naturally occurring clays lack the quality of "attrition-resistance" which is very important in any catalytic system which places its catalyst particles in "fluid motion." Moreover, catalytic clays of this type also have to be extensively treated before they can be used as "cracking catalysts." For example U.S. Pat. No. 2,848,423 notes that in order for its particular process to be effective, its kaolin catalyst ingredient first has to be "sized" in order to obtain kaolin particles of less than about 2 microns. These sized particles are then aggregated and subjected to elevated temperatures. The resulting materials are thereafter treated with hydrogen sulfide at about 1200° F. in order to form aggregates which, in turn, are exposed to ammonium chloride in order to selectively remove any iron present in the kaolin aggregates.

The need for so many preparatory steps, in conjunction with the fact that catalyst particles having high kaolin concentrations are subject to unacceptable attrition losses, provided a great deal of motivation to find more suitable catalyst materials. Eventually a large variety of other amorphous catalytic materials, and especially those having large proportions of alumina, were developed. The use of these materials represented a very significant step in this art because not only were these other alumina-containing materials more catalytically active than kaolin clays, they also were generally much more attrition-resistant. Later it was found that certain naturally occurring, crystalline zeolite materials such as y-faujasites also made very effective catalysts. They too proved to be generally more attrition-resistant than naturally occurring clays. However, because of their small crystalline sizes, naturally occurring zeolite particles have to be bound together with an attrition-resistant binder system in order to render them suitable for use in fluid catalytic cracking units (FCC units). Still later, whole classes of very effective synthetic, crystalline, zeolite catalysts, e.g., ZSM-5 were developed. Here again, since these synthetic zeolites also have very small crystalline sizes (e.g., average diameters of less than about 5 microns), they too have to be bound together in larger particle units by various "binder" or "glue" formulations. Those made of silica, alumina, silica/alumina, silica/magnesia, etc. are commonly employed for such purposes.

It also should be noted that not only do many of these glue or binder materials serve as attrition-resistant binder matrices, they also often serve as catalysts in their own right. This independent catalytic activity has proved to be an advantage in catalyzing some chemical reactions, but a disadvantage in catalyzing many others. Moreover, many of these glue or binder materials also are chemically reactive with many of the different kinds of catalyst particles they are called upon to bind together. Such chemical reactivity between a given binder material and a given species of catalyst particle may be an advantage in some cases, but generally speaking it is not considered to be an advantage; and in many cases it may well constitute a serious detriment to the catalytic activity of a given species of catalyst.

Those familiar with this art also will appreciate that most binder formulations can be used in at least five different ways, e.g., (1) they can be used to "glue together" (hence their appellation "binder" materials) various catalyst particles into larger catalyst matrices, especially in those cases where the catalyst particles are so small that they would be susceptible to unacceptable elutriation losses, (2) they can be used to grow, in situ, certain lattice structures useful in forming catalyst matrices, (3) they can be impregnated with liquid catalyst solutions such as those of various Group VIII metals, (4) they can be introduced as catalytically inert binder particles into various chemical processes in order to "dilute" the concentration of, and hence the activity levels of, active catalyst particles being used in said processes and (5) they can be used as catalytically active materials in their own right; that is to say they can simultaneously serve both as a "binder" and as a "catalyst".

The need to perform so many varied catalytic functions also has resulted in an ever expanding need for catalyst materials of greater and greater complexities. Because of this, catalyst particles having more than one species of active catalyst are often employed to simultaneously carry out several different catalytic duties. For example, use of several different kinds of zeolite catalysts, e.g., the use of zeolite catalysts and amorphous catalysts, in the very same particle has proven to be an effective technique in such varied chemical processes as hydrocracking, alkylation, dealkylation, transalkylation, isomerization and polymerization. Many low-soda exchanged Y-zeolite catalysts and ultrastable Y-zeolite catalysts also are known to be especially useful when agglomerated into multi-catalyst-containing particles.

The use of such multi-component catalysts also has led to a need for more and more "universally nonreactive" binder materials. That is to say that the need for more complex catalyst particles has intensified the need for binder materials which are capable of binding several kinds of catalyst particles into suitable forms (e.g., into microspheroidal particles) without the binder either entering into undesired chemical reactions with any of the different catalyst species in a given particle or without the binder entering into the catalytic reaction(s) being catalyzed by that particle. At present, various complexes of alumina, alumino-silicate compounds, silica, magnesia, silica-magnesia, chromia, zirconia, gallium, germanium, etc., are the materials most widely employed as "universal" binders. For the purposes of this patent disclosure, all such universal binder materials may be thought of as being—and referred to as—"glue" or "binder" materials. That is to say that—if they are not to be used in their own right as catalytic materials—their chief function is to "glue" various active catalyst particles together to form larger particles. However, as was previously noted, many of these universal binder materials are in fact catalytically active in certain catalytic environments where it would be more advantageous if they were completely inert.

Those skilled in this art also will appreciate that regardless of the specific catalytic duties to which a given binder material is put in a given fluid catalytic process, elutriation losses will occur when particles of different sizes, shapes and/or velocities undergo inter-particle impacts. Such impacts tend to shatter or otherwise damage the matrices of all such materials. Hence, smaller and smaller fragments are constantly being formed and subsequently lost via cyclone elutriation of the resulting smaller particles. Fragments having diameters of less than about 20 microns are especially susceptible to elutriation losses.

Other losses occur as a result of differences in the densities of two or more catalyst species used in the same "fluid" process. That is to say that in many modern catalytic cracking processes, it is not at all uncommon to have as many as a half dozen different kinds of catalyst species simultaneously circulating through a reaction system in order to carry out distinctly different catalytic functions. Consequently, classification and sequestration are often caused by the action of a mass of reaction vapors sweeping through and separating different kinds of catalyst particles according to their density differences. Consequently, use of the very same binder material to make different catalyst species is a widely employed practice since it tends to create like densities in the different particle species. Thus, for all of the above noted reasons, the catalyst-employing chemical arts have an ongoing interest in developing more attrition-resistant, "universal", binder formulations.

The catalytic arts also have long recognized that certain naturally occurring clays have those "universal" binding qualities which are so useful in formulating a wide variety of catalysts. However, prior art attempts to use such clays in catalyst formulations have been thwarted time and again by the fact that those binder materials having large proportions of such clays are usually much too "soft" for use in fluid catalytic systems. That is to say that most high clay content binder or catalyst materials generally lack the quality of "toughness" or "attrition-resistance"; and, hence, easily succumb to those forces associated with particle impacts which eventually lead to the creation of smaller particles and unacceptable elutriation losses. Consequently, the role of naturally occurring clays in the catalytic arts has steadily decreased since the 1930's when they were widely used as petroleum cracking catalysts. At present, naturally occurring clays such as kaolin are only sparingly used as catalysts or as binder materials, and then only in conjunction with much larger proportions of those alumina, silica-alumina, silica-magnesia, zeolite, etc., "glue" type materials previously noted.

Naturally occurring clays do, however, continue to play somewhat larger roles in some catalyst formulations as "filler" ingredients. In this "filler" capacity, such clays (in conjunction with various inorganic glues of the types previously described) are used in order to give "body" to certain catalyst matrices at the lowest possible costs. Perhaps the most important property of a clay for fulfilling such a "filler" function is that it be chemically inert with respect to the catalytic ingredients employed in a given formulation. As was previously noted, this same characteristic also is useful when a clay is used as a "binder" material. However, the role of a clay "filler" is not exactly the same as that of a clay "binder" in the herein described processes. For example, a clay "filler", most preferably, will not enter into chemical reactions with any of the other ingredients in the binder formulation. On the other hand, when acting as a "binder", a clay ingredient, most preferably, will react to some limited degree with some other ingredient in the binder formulation. As will be seen in later parts of this patent disclosure, applicant's clay ingredient chemically reacts with a phosphate-containing ingredient to form a viscous reaction product. This reaction product, once formed, should not, however, chemically react with any catalyst particles which are subsequently introduced into the formulation.

It also should be emphasized that in these filler applications, certain clays may comprise high percentages (e.g., higher than about 10 percent by weight) of the overall catalyst formulation; but, again, in such cases, they act as completely inert "fillers" and not as either "active catalysts" or as "binder materials". Those skilled in this art also will appreciate that filler clays also should have certain particle sizes and/or morphologies. Typically, certain inert kaolin clay materials having particle sizes less than about 0.25 microns are employed for use in such "filler" capacities. Moreover, the use of so-called "ball" clays (as opposed to "plate" or "rod" forms) is a highly desired—and sometimes mandatory—attribute of those filler clay particles used in proportions larger than about 10 percent. Absence of these qualities normally will detract from the attrition-resistance of any particles in which clays serve as fillers. On the other hand, clays used in binder roles generally do not have as stringent size and morphology restrictions.

The fact remains, however, that since naturally occurring clays are so much less costly than the alumina, silica, etc. "glue" materials previously noted, and since they can bind so many different kinds of catalyst particles without chemically reacting with them, and since they are catalytically inert with respect to so many chemical reactions, binder formulations having large clay proportions would be very welcome additions to the catalyst arts—if the attrition problems currently associated with their use as binders (as opposed to their use as fillers) could somehow be obviated.

It also should be noted that binder and/or catalyst matrix attrition problems arising from the presence of large proportions of such clays have been addressed through the use of greater proportions of "hard" binder and/or catalyst ingredients (and especially through the use of greater proportions of hardness-imparting "glue" or catalyst ingredients). That is to say that, in the past, attrition-resistance problems with clay-containing catalyst particles have been addressed by using relatively less clay and relatively more hardness imparting ingredients such as alumina and/or silica. Attrition-resistance problems also have been addressed—incidentally—through the use of various chemical treatments which are primarily employed to implement, improve or diminish the catalytic activities of various active catalyst materials. By way of example only, U.S. Pat. No. 4,594,332 recognizes such activity/hardness interrelationships in that it teaches production of hard, fracture-resistant binder systems from zeolites of the pentasil family by use of a process wherein water, organic additives such as hydroxyethylcellulose and a silicate are added to zeolite particles so that the resulting particles are rendered both more catalytically active and more attrition-resistant. However, this favorable outcome is not the usual case; indeed, very often catalytic activity must be "sacrificed" in direct proportion to any gains made in attrition resistance.

Another set of problems associated with production of attrition-resistant catalyst particles follows from certain inherent restrictions which must be placed upon those so-called "gel reaction" processes which are commonly employed to make many kinds of catalysts. For one thing, they must be carried out in some rather restricted pH ranges (especially those confined to alkaline, i.e., 8.0 to 14.0 regions of the pH scale). For example, the gel reaction step of U.S. Pat. No. 4,471,070 (the 070 patent) is restricted to a 8.5 to 10.5 pH range. Similarly, the gel reaction taught by U.S. Pat. No. 4,728,635 (the 635 patent) is preferably carried out in a 7.0 to 10.5 pH range.

The rather narrow, alkaline, pH limitation placed upon the process taught by the 070 patent follows from the fact that higher pH values would force a chemical shift which favors the formation of alkaline aluminum, i.e., the aluminate anion, $AlO_2^{\ominus}$. However, aluminate anions are soluble in water and therefore subject to being "washed out" during subsequent filtration steps to which these materials must be submitted. Similarly, the 635 patent teaches use of aluminum oxide in an alkaline medium of magnesium compounds in order to attain a distinctly alkaline ionization medium. Under such conditions, small dispersed particles of aluminum oxide having maximum effective surface areas are rapidly associated with water molecules and thereby establish an equilibrium which also favors the anionic form of aluminum as its aluminate (i.e., $AlO^{\ominus}_2$) ion. Many other gel reactions have similar restrictions to the use of mildly alkaline reaction systems. Indeed, the prior art has, to a large degree, accepted the idea that any attempts to carry out gel reactions in either a strongly basic or a strongly acidic reaction system will usually lead to some degree of damage to aluminum-containing molecules which tends to weaken any catalyst matrix made from them.

This restriction of the prior art to mildly alkaline reaction conditions has several implications which bear upon the novelty and scope of applicant's invention because the chemical reactions of the herein described processes can be—and in many instances preferably are—carried out in strongly acidic conditions as well as in strongly alkaline ones. This fact indicates that applicant's reactions are qualitatively different from the "gel reactions" employed by the prior art. Thus, applicant's processes can be distinguished from much of the prior art by the fact that they have both "acid versions" and "alkaline versions". Regardless of the version employed, however, the most important aspect of applicant's processes remains the fact that they can employ large proportions of naturally occurring clays in order to produce binder matrices (and binder/catalyst matrices) without thereby rendering those matrices too "soft" for use in fluid catalytic processes. The fact that extremely high levels of attrition-resistance can be achieved without "sacrificing" the catalytic activity of any active catalyst particles which may be placed in applicant's binder systems also is a most important aspect of these processes.

SUMMARY OF THE INVENTION

This invention generally involves the use of: (i) large proportions (i.e., proportions greater than about 20%, and in many cases proportions up to about 98%) of naturally occurring clays (e.g., kaolinites), (ii) various phosphate-containing compounds, (iii) select pH conditions and (iv) certain drying and calcination procedures in order to produce highly attrition-resistant binder formulations. Some particularly preferred embodiments of this invention involve the use of certain specific kinds of clays—namely those which have been subjected to delamination and calcining procedures before they are used as ingredients in the herein described processes. Thus, the attrition-resistant qualities produced by the hereinafter described processes are the result of both chemical reactions and physical process (such as the use of heat) which, when used in the ways described in this patent disclosure, produce binder materials that have certain vitreous or glass-like qualities which render the resulting particles attrition-resistant. Consequently, a large part of this patent disclosure will be devoted to describing the chemical parameters of a series of clay/phosphate reactions in conjunction with those temperature parameters which must be placed upon the products of those chemical reactions in order to impart the desired vitreous qualities to the end products of these reactions and procedures.

Another insight into applicant's overall invention can be obtained through the understanding that the herein described processes can be carried out from either of two different initial pH orientations. One might be thought of as applicant's "acid reaction" orientation; the other might be regarded as an "alkaline reaction" orientation. In either case, however, the binder materials ultimately produced by applicant's processes can be used in their own right; or they can be used to bind a wide variety of small, catalytically active, particles into more useful forms such as those microspheroidal catalyst "particles" which are commonly employed in fluid catalytic cracking operations.

Another insight into this invention can be gained from an appreciation that both the acid versions and the alkaline versions of applicant's process can, in turn, be carried out to produce particles falling into two broad categories. One category might be termed: "simple binder particles" (wherein the word "simple" implies those binder particles which do not contain active catalyst ingredients); the other category might be termed: "catalyst-containing binder particles" (i.e., particles which do contain active catalyst particles). The simple binder particles and the catalyst-containing binder particles can each be broken down into two further subcategories, i.e., those whose principle ingredients are clay and phosphate and those whose principle ingredients are clay and an "auxiliary binder component" which, in turn, is comprised of one or more auxiliary binder material(s) of the "glue" type binders previously noted (e.g., alumina, silica, silica-alumina, silica-magnesia, etc.) and one or more phosphate-providing compound(s). Applicant's catalyst-containing binder particles can likewise employ either of these two kinds of binder systems.

Generally speaking the "simple binder particles", (i.e., those containing only clay and phosphate ingredients) will contain from about 80 to about 98 percent clay and from about 2 to about 20 percent phosphate. Phosphate percentages of from about 6 to about 12 weight percent are even more preferred in these simple binder particles. Any simple binder particles which contain less than about 2.0 percent phosphate will, however, generally require the presence of an auxiliary binder component. When such auxiliary binder components are used, the phosphate component proportion can vary from as low as about 0.25 percent to as high as about 20 percent. Proportions from about 0.25 to about 2.0 percent phosphate are, however, highly preferred when such auxiliary binder components are employed, if for no other reason than the relative costs of the alternative ingredients. Broadly speaking, the auxiliary binder component will comprise from about 5.25% to about 60.0% of the resulting binder particles. That is to say that the resulting simple binder particle having an auxiliary binder component will be comprised of from about 40 to about 94.75 percent clay and from about 5.25 to about 60 percent of the auxiliary binder component. The auxiliary binder component, in turn, will be comprised of from about 5.0 to about 40 weight percent of an auxiliary binder material of the types previously mentioned (alumina, silica, magnesia, etc.) and from about 0.25 to about 20 percent phosphate. In other words, the auxiliary binder component will be comprised of an auxiliary binder material (i.e., a "glue" type binder other than the clay ingredient of the given binder formulation) and a phosphate-providing compound such as phosphoric acid, ammonium phosphate, etc. The resulting end product particles can be comprised of virtually any proportions of the phosphate-providing compound and the auxiliary binder material (e.g., alumina, silica, silica-alumina, etc). However, the phosphate-containing material of the auxiliary binder component must be sufficient to provide the end product binder particles with at least about 0.25 percent phosphate. That is to say that, the auxiliary binder component might provide from about 0.25 to about 20.00 weight percent phosphate to the end product binder particle, but will most preferably provide from about 0.25 to about 2.0 percent phosphate. In any case, one or more auxiliary binder materials will comprise the remainder of the auxiliary binder component. In other words, the auxiliary binder material (e.g., alumina, silica, silica-alumina, etc.) may comprise from about 5.0 to about 40.0 weight percent of the end product binder particles. Within these proportions, those auxiliary binder components which provide the end product binder particles with from about 1.0–2.0 weight percent phosphate and from about 5.0 to about 20.0 weight percent of the auxiliary "glue" or binder materials (e.g., alumina, silica, alumina-silica, etc.) are most preferred. As in the previous case involving the use of binders made of only clay and phosphate, the remainder of the auxiliary binder component-containing end product matrices will be comprised of a clay component which will represent from about 40 percent to about 94.75 percent of said end product matrices.

The "catalyst-containing binder particles" of this patent disclosure also can be of two general types, i.e., (1) those having a clay and phosphate binder system in which the active catalyst component "resides" and (2) those having an auxiliary binder component and a clay component which together constitute a binder system in which an active catalyst component "resides." Some particularly preferred versions of the particles resulting from these clay/phosphate/catalyst embodiments of applicant's invention will generally be comprised of from about 20 to about 95 percent clay, from about 2.0 to about 20 percent phosphate and from about 3 to about 60 percent active catalyst That is to say that these particular versions of applicant's processes employ only clay, phosphate and catalyst. However, other embodiments of applicant's catalyst-containing matrices (a la the simple binder formulations noted above) can employ applicant's "auxiliary binder components" rather than clay/phosphate binder formulations comprised of only clay and phosphate ingredients.

Those "catalyst-containing binder particles" prepared with an auxiliary binder component (rather than phosphate-containing compounds alone) generally will have an overall constitution somewhat analogous to those "simple binder particles" which employ applicant's "auxiliary binder component" rather than only a phosphate-containing compound. For example, the auxiliary binder component in such catalyst-containing binder particles also will constitute from about 5.25 to about 40 weight percent of the resulting catalyst particles. The remainder of the end product catalyst particles will be comprised of a clay component (which will comprise from about 20 to about 91.75 weight percent of the particle) and a catalyst component which will preferably comprise from about 3.0 to about 40.0 weight percent of the resulting clay/phosphate/auxiliary binder catalyst particles.

As was the case of the "simple binder particles", the auxiliary binder component of these "catalyst-containing particles" can accommodate virtually any proportions of a auxiliary binder material and phosphate, but they too are limited by the caveat that the phosphate must be present in an amount sufficient to give the resulting catalyst particles a phosphate content of at least about 0.25 percent by weight. Auxiliary binder material proportions of from about 5 to about 20 percent are highly preferred in the resulting particles. The phosphate percentage of these end product catalyst particles can likewise range from about 0.25 to about 20.0 weight percent of the end product; but here again, phosphate percentages of from about 0.25 to about 2.0 are preferred (if for no other reason than the relative costs of the alternative ingredients) in these auxiliary binder-containing formulations. And, once again, auxiliary binder component material(s) such as alumina, silica, alumina-silica, etc.) are preferred ingredients for making up the remainder of these auxiliary binder components. The auxiliary binder materials will preferably range from about 5.0 to about 20.0 percent of the end product catalyst particle. Again, those auxiliary binder components which provide these auxiliary binder/catalyst-containing end product particles with from about 0.25 to 2.0 percent phosphate—and from about 5–20 weight percent of the auxiliary binder material (alumina, silica, silica-magnesia alumina-magnesia, etc.) are highly preferred.

As a final note on the subject of the relative proportions of these ingredients, it should also be understood that, unless otherwise indicated, the percentage compositions associated with the above-described binder or catalyst particles—as well as the ingredients from which they are made—should be taken to mean percentages by weight and not by volume. It also might be noted at this point that, for the purposes of this patent disclosure, the term "particles" should be broadly construed to include sizes larger than the 60–80 micron sizes usually imparted to those microspheroidal catalyst particles which are used in fluid catalytic cracking units. Indeed, for applicant's purposes, the term "particles" also should be taken to include those catalyst "extrudates" which are commonly made in much larger sizes (0.5 to 1.0 inches) through the use of so-called catalyst "extrusion" techniques. Such "larger" particles are often employed in "stationary" catalyst beds rather than in "fluid" processes.

Now, having noted various possibilities with respect to the identities and relative proportions of the ingredients, it next should be very strongly emphasized that applicant's overall inventive concept does not reside solely in the use of those ingredients and/or their relative proportions. Utilization of the hereinafter described pH and calcining conditions also are extremely important to the overall success of each version of applicant's processes.

In order to gain an initial appreciation for the importance of applicant's pH-providing steps, it again should be noted that applicant's overall invention has "acid reaction" versions and "alkaline reaction" versions. Either of these versions can be employed to initially place a clay under an "extreme" pH condition before said clay is chemically reacted with an appropriate phosphate ingredient. For example, in most cases applicant has found that if a clay slurry is not first adjusted to an appropriate pH level, e.g., first brought to a strongly acidic pH (a pH of from about 1.0–3.0) or in some cases first brought to a strongly basic pH level (e.g., a pH of from about 13.0–10.0), before the phosphate-containing compound is introduced into the slurry, then the desired attrition-resistance qualities in any resulting matrix particles will be greatly diminished.

Poor results with respect to the "catalytic activity" (as opposed to "attrition-resistance") of the resulting particles also will generally result from introducing any catalyst into the clay/phosphate slurry before the slurry is brought to a pH of from about 4.0 to about 8.0. That is to say that if the catalyst particles were introduced into a slurry while it is in the strong acid pH range of from about 1.0 to about 3.0 range (or while it was in a strong alkaline pH of from about 14.0 to about 8.0 range), the resulting catalyst materials would have poorer catalytic activities even though they still may have attrition-resistance properties superior to those otherwise obtained from the proper use of applicant's processes. For example, introduction of a catalytically active ingredient into applicant's strongly acidic (e.g., 1.0–3.0 pH) or strongly alkaline (e.g., 14.0–10.0) clay slurries normally will be detrimental to the catalytically activity of that ingredient even if it is not detrimental to the attrition-resistance of the resulting matrix.

Thus, applicant's processes can be further categorized by the fact that if no active catalyst particles are involved, the introduction of a phosphate-containing compound may or may not take the clay slurry out of its initial "extreme" pH level. For example, the introduction of the phosphate may take an "acidic" clay slurry above its initial 1.0–3.0 pH level. On the other hand, the clay/phosphate reaction may just as well be carried out in its initial 1.0 to 3.0 pH range without detrimental effects on the attrition-resistance qualities of the end product particles. Such variations in the pH of the reaction system can be controlled by the identity and relative proportions of the phosphate-containing ingredients. For example, ammonium phosphate is alkaline in nature while phosphoric acid is acidic. Thus, combinations of various phosphate-containing ingredients can be employed to remain in the initial 1.0–3.0 pH level, or to move up into higher pH levels of from about 4.0 to about 8.0. Applicant also has found that mixtures of monobasic ammonium phosphate and dibasic ammonium phosphate are particularly useful for such "pH adjustment" purposes. Thus, any or all of these measures may be used to adjust the pH of a given slurry up or down so that the pH of the resulting particles can be controlled and thereby exert an influence on the catalytic activities being carried out by such particles.

Applicant believes that the underlying requirement for applicant's pH adjustment steps (at least in the case of the acidic reaction versions of this invention) follow from the fact that the crystalline lattice structures of the clay particles used in applicant's processes contain aluminum components which are normally covalently bonded to oxygen. Therefore, the pH adjustment step of applicant's process is primarily intended to change this bonding arrangement to one in which the aluminum components are in a plus three valance state (i.e., $Al^{+++}$ which is not bonded with oxygen as it is in the clay's untreated state). Achievement of this valance state renders the aluminum component of the clay particles capable of forming complexes with ammonium; and this in turn brings about creation of the ammonium aluminum phosphate complex units needed to carry out the herein described processes. That is to say that applicant believes that the chemical mechanism of the herein described processes revolve around formation of a complex of aluminum components and ammonium (which assumes the role of a monovalent cation) after the aluminum component is rendered into a trivalent cationic form by preacidification of the clay—at least in all cases where such preacidification is necessary. That is to say that some clays may be so constituted that they require no preacidification, but this will not be the general case since most clay species will, in fact, require pH adjustment measures (e.g., acidification) in order to change the aluminum-oxygen bonds found in most naturally occurring clays to a cationic form, i.e., $Al^{+++}$ which is capable of producing the desired ammonium-/aluminum/phosphate complex units. Thereafter, the ammonium units of the ammonium/aluminum phosphate complex are driven off the complex by applicant's calcination step.

Again, this will be the general case; however, there may be special cases wherein the aluminum component of a given clay species already will be in a suitable condition for direct combination with the phosphate oxygen. Another case which permits direct production of ammonium/aluminum/phosphate complexes will be direct application of a strong base such as ammonium hydroxide to the slurry in order to carry out the "alkaline" versions of applicant's processes. In any event, the more general "acid version" of our processes, as well as the less general "alkaline versions" are each characterized by their need for a preconditioning, pH adjustment step in order to obtain the "ammonium/aluminum/-phosphate complex units" which are so important to applicant's overall process.

Again, when a simple clay binder system is required there need only be a pH adjustment which naturally follows from introduction of the ammonium and phosphate ion-containing materials into the slurry. However, when active catalyst particles are added to the slurry, a second pH adjustment will usually be required to provide the slurry with a pH (e.g., a pH of from about 4.0 to 8.0) which will serve to preserve the catalytic activity of any active catalyst ingredients added to the slurry. That is to say that such a second pH adjustment will usually serve to foster production of attrition-resistant catalyst particles without sacrificing the catalytic activity of the catalyst particles.

Thereafter the slurry is dried (e.g., by spray drying) and then calcined. As the calcination proceeds, a temperature is first reached at which surface reactions most probably take place at the aluminum locations where salt is concentrated. Applicant believes that the chemical mechanism for these reactions are as follows:

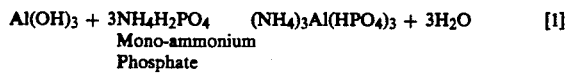
Mono-ammonium
Phosphate

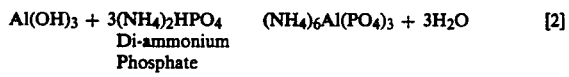
Di-ammonium
Phosphate

Upon further heating, typically:

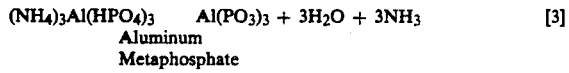
Aluminum
Metaphosphate

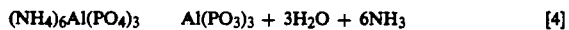

Thus, in the final phase, the orthophosphates decompose to the metaphosphate giving off gases of water and ammonia from the solid matrix of the "macro-particle." The resulting metaphosphate, having a lower melting point, fluxes with the remaining aluminum and fuses into a acid porous, vitreous, "shell" around the remainder of the particle.

It also should be noted that if this theory of the chemical mechanism of these processes—at least the acid reaction versions—is correct, then the micro-particles will be attached at edges and corners by the fused metaphosphate. Similarly, all projecting edges and corners are coated with metaphosphate: a hard, vitreous armor cover or shell which serves to protect the macro-particle against abrasion, yet leaving a strong skeletical structure welded together to provide strength against impact and rupture. It also will be noted that the porosity and pore inner surfaces are left intact, permitting the catalyst to retain its full catalytic activity. Furthermore, by adjustment of the chemical and physical parameters of the steps as described, these processes may be made for manufacture of any desired clay-based catalyst which may be envisioned.

Some of the most general versions of applicant's process for preparing attrition-resistant binder particles would involve: (1) preparing a clay slurry having from about 20 to about 50 weight percent clay, (2) adjusting the pH of the clay slurry to a level which places an aluminum component of the clay in an oxidation state which is conducive to formation of an ammonium-/aluminum/phosphate complex, (3) providing the clay slurry with ammonium ions and with phosphate ions by introducing therein an ammonium phosphate compound selected from the group consisting of monoammonium acid orthophosphate, diammonium acid orthophosphate and triammonium orthophosphate and thereby producing a clay slurry having ammonium-/aluminum/phosphate complex units, (4) drying the slurry to produce solid particles, and (5) calcining said solid particles in order to produce attrition-resistant binder particles.

Again, when active catalyst-containing particles are to be produced by these processes, it will usually be necessary to adjust the pH level of the ammonium/aluminum/phosphate complex-containing slurry to another pH level (e.g., to 4.0 to 8.0) which does not do harm to the catalytic activity of the catalyst particles.

Having noted all of the above general points, applicant now can turn to some of the more exact process details that can be used to further distinguish the above-noted "acidic" and "basic" versions of the herein described processes. In order to begin to make these further distinctions, applicant will describe in patent claim language some particularly preferred "acid reaction" versions of applicant's overall process for preparing attrition-resistant binder materials. Thereafter some particularly preferred "alkaline reaction" versions of these processes will be described in a similar manner.

Acid Reaction Embodiments

Perhaps the most preferred acid reaction embodiment of applicant's invention will comprise: (1) preparing a clay slurry having from about 20 to about 50 weight percent of a clay ingredient, (2) bringing the clay slurry to a pH of from about 1.0 to about 3.0; (3) mixing a monobasic, dibasic and/or tribasic phosphate-containing compound (preferably a mixture thereof which also most preferably includes phosphoric acid) into the clay slurry in an amount which is sufficient to form a viscous, clay/phosphate compound slurry which remains at a pH from about 1.0 to about 3.0 and which also is sufficient to provide a quantity of phosphate which is such that the attrition-resistant binder material ultimately made from the slurry will be comprised of from about 2 to about 20 weight percent of phosphate with the remaining 80 to 98 percent of said attrition-resistant binder material being comprised of the clay, (4) drying (e.g., by spray drying, extruding, etc.) the clay/phosphate slurry to produce solid particles (or larger catalyst units such as larger extrudate agglomerates) and then (5) calcining the finely divided, solid particles (or larger units) to produce attrition-resistant binder "particles". With respect to the pH aspects of this process, the most important point to be made is that the clay slurry is brought to an extremely "low" pH level (1.0 to 3.0) before the phosphate is introduced into said slurry. Again, such an adjustment of the pH level is an essential step of all such "acidic reaction" versions of these processes. Again introduction of a phosphate-containing compound into a clay slurry initially having a higher pH value (e.g., one in the 5.0 to 8.0 range) will not produce the ammonium/aluminum/phosphate complex units which are necessary to the ultimate production of end product particles having superior attrition-resistance properties.

Next, it again should be noted that there are certain versions of applicant's processes—particularly those resulting in binder particles having less than about 2 percent phosphate—wherein a auxiliary binder component (rather just a phosphate-containing component) is employed "in place of" some portion of the phosphate component. Again, these auxiliary binder components will be comprised of a "glue" type binder (alumina, silica, silica-alumina, silica-magnesia, etc.) ingredient and a phosphate-containing ingredient (phosphoric acid, various ammonium phosphate compounds, etc.). In such cases, the "glue" type binder material also may be thought of as any binder material other than the clay ingredient which is used in that given binder formulation.

For example, use of such an auxiliary binder component to produce applicant's "simple binder particles" (i.e., those matrices which do not contain an active catalyst ingredient) can be readily accomplished by a process which comprises: (1) preparing a clay slurry having from about 20 to about 50 weight percent clay; (2) bringing the clay slurry to a pH of from about 1.0 to about 3.0; (3) mixing a phosphate-containing compound and an auxiliary binder material (which collectively constitute an auxiliary binder component of the overall resulting attrition-resistant binder material) into the clay slurry in order to form a clay/phosphate-containing compound/auxiliary binder material slurry which has a pH which generally remains in the 1.0 to 3.0 range and which provides quantities of the phosphate-containing compound and the auxiliary binder material which are such that the attrition-resistant binder particles ultimately made from the clay/phosphate-containing compound/auxiliary binder material slurry will be comprised of from about 5.25 to about 60.0 weight percent of an auxiliary binder component and from about 40 to about 94.75 weight percent of a clay component. Here again, the auxiliary binder component will have an amount of phosphate which is sufficient to make the binder particles ultimately made from this particular process comprise from at least about 0.25 phosphate and up to about 20.0 percent phosphate with the remainder of the auxiliary component being comprised of the auxiliary binder material (e.g., the auxiliary binder material will comprise from about 5.0 to about 40.0 percent of the resulting particles; (4) drying the clay/phosphate auxiliary binder material slurry to produce solid particles; and (5) calcining said solid particles in order to complete the production of the attrition-resistant binder particles.

Another "acid reaction" version of applicant's process for preparing attrition-resistant binder materials can use the phosphate-containing compound to move the acidic clay slurry from a more acidic level (e.g., 1.0 to 3.0) to a more "neutral" pH level (e.g., from about 4.0 to about 8.0). That is to say that this version of applicant's acid reaction process uses the phosphate ingredient to take the clay slurry out of the initial 1.0 to 3.0 pH domain needed to create the desired ammonium-/aluminum/phosphate complex units and bring it to a pH level, e.g., from about 4.0 to about 8.0 which will have a higher pH value which may be useful in its own right or which may create an environment which will not destroy the catalytic activity of any catalyst particles subsequently introduced into the slurry. Generally speaking, such embodiments of applicant's process will comprise: (1) preparing a clay slurry having from about 20 to about 50 weight percent of a clay ingredient, (2) bringing the clay slurry to a pH of from about 1.0 to about 3.0, (3) mixing a monobasic, dibasic and/or tribasic phosphate-containing compound into the clay in an amount which is sufficient to form a clay/phosphate compound slurry having a pH from about 4.0 to about 8.0 and also sufficient to provide a quantity of phosphate which is such that the attrition-resistant binder material ultimately made from the slurry will be comprised of from about 2 to about 20 weight percent of a phosphate component with the remaining 80 to 98 percent of said attrition-resistant binder material being comprised of the clay, (4) drying (e.g., by spray drying, extruding, etc.) the clay/phosphate slurry to produce finely divided, solid particles (or larger catalyst units such as larger "extrudate" type agglomerates) and then (5) calcining the finely divided, solid particles (or larger extrudate units) to produce attrition-resistant binder material particles.

And here again, the phosphate-containing compound of the process just described can be partially replaced with an auxiliary binder component comprised of an auxiliary binder material (alumina. alumina-silica, silica-magnesia, etc.) and a phosphate-containing material (phosphoric acid, various ammonium phosphate(s) and mixtures thereof). That is to say that an auxiliary binder-employing version of applicant's process can be employed in a "neutral pH" (4.0 to 8.0) region to carry out applicant's process. This version will be essentially the same as the acidic version of the auxiliary binder—employing processes—previously described. The only real difference will be that, rather than maintaining the clay slurry at its initial 1.0 to 3.0 pH level, these auxiliary binder component-employing embodiments will, most preferably, use the phosphate-containing compounds to adjust the pH of the slurry into the 4.0 to 8.0 range and thereby providing end product particles having pH levels which are higher than those which would be obtained if the slurry were allowed to remain in its initial 1.0 to 3.0 pH range.

Other highly preferred "acid reaction" embodiments of applicant's process are specifically designed to employ distinct, "active catalyst" particles, that is, to produce more specific embodiments of applicant's attrition-resistant clay/phosphate/catalyst matrix particles. In other words, these more particular embodiments use applicant's "acid reaction" processes to incorporate active catalyst particles into a continuous phase comprised of a clay/phosphate binder system in order to form larger (e.g., microspheroidal sized) active catalyst-containing particle units. These embodiments generally will comprise: (1) preparing a clay slurry having from about 20 to about 50 weight percent of a clay ingredient, (2) bringing the clay slurry to a pH of from about 1.0 to about 3.0, (3) mixing a monobasic, dibasic and/or tribasic phosphate-containing compound (again ammonium-containing phosphate compounds are highly preferred for this purpose) into the clay slurry in an amount which is sufficient to form a clay/phosphate compound slurry having a pH from about 4.0 to about 8.0 and sufficient to provide a quantity of phosphate which is such that the clay/phosphate/ catalyst matrix particles ultimately made from the slurry will be comprised of from about 2 to about 20 weight percent phosphate; (4) mixing a sufficient amount of catalyst particles into the clay/phosphate compound slurry in order to form a clay/ phosphate compound/catalyst particle slurry which has a quantity of catalyst particles which is such that the attrition-resistant clay/phosphate/catalyst matrix particles ultimately made from this process will contain from about 3 to about 60 weight percent of said catalyst particles, (5) drying (by spray drying, extruding, etc.) said clay/phosphate compound/catalyst particle slurry in order to produce solid particles, and (6) calcining the solid particles to produce attrition-resistant binder/ catalyst matrix particles which contain between about 3 and about 60 percent of the catalyst particles and between about 20 and about 95 percent clay and about 2 to about 20 percent phosphate.

It should be very strongly emphasized that in these active catalyst particle-containing embodiments of applicant's process the slurry should be adjusted to the 4.0 to 8.0 pH level before the catalyst is introduced therein. Again, applicant has found that if active catalyst particles such as zeolites are introduced into these slurries while they are in the initially low pH state (e.g., from 1.0 to 3.0), the catalytic activity of the resulting catalyst will suffer considerably. Indeed, the best pH levels for introduction of catalysts into such clay slurries are those which are neutral or nearly so (e.g., those having pH levels of from about 6.5 to about 7.0 are particularly preferred). This all goes to say that in these particular embodiments, active catalyst particles should be introduced into the clay slurry only after introduction of a more alkaline material and especially a phosphate-containing compound, has raised the pH of the clay slurry to values of from about 4.0 to about 8.0. Again, however, this does not mean that applicant's initial acidification step (which creates the initial 1.0 to 3.0 pH value) can be neglected when active catalyst particles are employed—indeed, if the slurry were simply brought directly to the 4.0 to 8.0 level, without first attaining these low pH conditions the desired ammonium/aluminum phosphate complex units previously described would not be produced and the resulting particles would have rather poor attrition-resistance qualities.

This catalyst-employing, acid reaction, version of applicant's process also can be modified to employ an "auxiliary binder component" comprised of an auxiliary binder material and a phosphate. Such a process will comprise: (1) preparing a clay slurry having from about 20 to about 50 weight percent clay; (2) bringing the clay slurry to a pH of from about 1.0 to about 3.0; (3) mixing a phosphate-containing compound and an auxiliary binder material (which collectively constitute an "auxiliary binder component" of the end product, attrition-resistant clay/phosphate/auxiliary binder material catalyst matrix particles) into the clay slurry to form a clay/phosphate-containing compound/auxiliary binder material slurry in an amount which is sufficient to form a clay/phosphate-containing compound/auxiliary binder material slurry having a pH from about 4.0 to about 8.0 and to provide quantities of phosphate and auxiliary binder material which are such that the clay/phosphate/catalyst matrix particles ultimately made from the slurry will be comprised of from about 5.25 to about 40 weight percent of the auxiliary binder component; (4) mixing catalyst particles into the clay/phosphate compound/auxiliary binder material slurry to form a clay/phosphate-containing compound/auxiliary binder component/ catalyst particle slurry which has a quantity of catalyst particles which is such that the attrition-resistant clay/phosphate/ catalyst matrix particles ultimately made from this process will contain from about 3 to about 40 weight percent of said catalyst particles; (5) drying said clay/phosphate compound/ catalyst particle slurry to produce finely divided, solid particles; (6) calcining the solid particles to produce attrition-resistant binder/catalyst matrix particles which contain between about 3 and about 60 percent by weight of the catalyst particles, between about 5.25 and about 40 weight percent of the auxiliary binder component and from about 20 to about 91.75 percent clay and wherein the auxiliary binder component has sufficient phosphate to give the clay/auxiliary component/catalyst particles a phosphate concentration of at least 0.25 percent by weight. Here again, when auxiliary binder materials are employed the most preferred phosphate percentages will generally be from about 0.25 to about 2.0 percent.

Applicant's acid reaction processes have various "most preferred" embodiments, features, steps, techniques, etc. These may include any one or all of the following: (1) creating a water/ kaolinite clay slurry by diluting a kaolinite clay slurry having about a 70% clay concentration to about a 40% clay concentration by the addition of water to the 70% slurry, (2) bringing the resulting clay/water slurry to a pH of from about 1.0 to about 3.0 through the use of phosphoric acid rather than some other acid, (3) introducing a mixture of monobasic ammonium phosphate (i.e., monoammonium acid orthophosphate) and dibasic ammonium phosphate (i.e., diammonium acid orthophosphate) into the 40% clay/water slurry in quantities such that the pH of the resulting clay/phosphate compound slurry is brought to a pH level of from about 4.0 to about 8.0 (but more preferably to a pH level of from about 6.5 to about 7.0) and such that the phosphate components of the ammonium phosphate compounds (including phosphoric acid if it is employed) represent from about 6.0 to about 12.0 weight percent of the slurry, (4) spray drying the resulting clay/phosphate slurry in a manner which produces particles predominantly in a 60–80 micron size range, (5) calcining said particles at about 1350° F. to produce the final product particles and (6) using the temperature conditions existing in a catalytic unit to perform applicant's calcination step, as opposed to performing a distinct calcination step in a calcination unit specially designed for such calcination operations and (7) using delaminated and calcined clays.

Alkaline Reaction Embodiments

The "alkaline reaction" embodiments of applicant's process can be used in ways which—except for their "alkalinity" features are generally analogous to the "acid reaction" versions of applicant's various processes. For example, they too can be employed to produce either simple binder particles (which contain no active catalyst ingredients) or catalyst-containing binder systems (which do in fact contain active catalyst particles). And, they too can employ clay/ phosphate binder systems or auxiliary binder components comprised of "glue type" binder materials and phosphate-containing compounds.

One particularly preferred version of applicant's alkaline reaction process for producing simple binder particles involves creating an extremely alkaline clay slurry (e.g., one having a pH of from about 13.0 or 14.0 to about 10.0) and then introducing a phosphate-containing compound into this slurry alkaline without appreciably lowering the slurry's pH through the use of an acid such as phosphoric acid. This "alkaline reaction" version of applicant's process for preparing attrition-resistant "simple binder particles" (i.e., binder particles not containing an active catalyst ingredient) will generally comprise: (1) preparing a clay slurry having from about 20 to about 50 weight percent of a clay ingredient, (2) bringing the clay slurry to a pH of from about 13.0 to about 10.0, (3) mixing an amount of a monobasic, dibasic and/or tribasic phosphate compound into the clay slurry which is (are) sufficient to form a viscous, clay/phosphate slurry and to provide a quantity of phosphate which is such that the slurry will be comprised of from about 2 to about 20 weight percent of phosphate and about 80 to about 98 percent clay, (4) drying (e.g., by spray drying, extruding, etc.) the clay/phosphate compound slurry to produce finely divided, solid particles and then (5) calcining the solid particles to produce attrition-resistant binder particles.

Another "alkaline reaction" version of applicant's process for preparing attrition-resistant binder particles involves driving the pH of the clay slurry below its initial, 13.0 to 10.0 level in order to produce "simple binder particles" having lower pH values. This version of the process will comprise: (1) preparing a clay slurry having from about 20 to about 50 weight percent of a clay ingredient, (2) bringing the clay slurry to a pH of from about 13.0 to about 10.0, (3) mixing a monobasic, dibasic and/or tribasic phosphate compound and/or an amount of an acid into the clay slurry which is such that the slurry will be comprised of from about 2 to about 20 weight percent of phosphate and about 80 to about 98 percent clay; (4) adjusting the pH of the resulting slurry to a level of from about 4.0 to about 8.0; (5) drying (e.g., by spray drying, extruding, etc.) the clay/phosphate compound slurry to produce solid particles and then (6) calcining the solid particles to produce attrition-resistant binder particles. Here again, the "adjusting" of the pH level to 4.0 to 8.0 can be accomplished by introduction of a phosphate-containing compound such as phosphoric acid.

Both of these "alkaline reaction" versions may also employ auxiliary binder formulations as a part of their overall formulations. For example, the use of less than about 2.0 percent phosphate also may invoke a need for the use of an auxiliary binder component (here again, those comprised of the previously noted auxiliary binder materials and phosphate-containing compounds are preferred) which can be used in the same general proportions employed in the "acidic reaction" versions of this process. Here again, however, the phosphate content of the auxiliary binder must be sufficient to provide the end product particles with a phosphate component of at least 0.25 percent by weight. The remainder of the auxiliary binder component will be an auxiliary binder material comprised of one or more of the alumina, silica, silica-alumina, etc. materials previously described under the general rubric of "glue" materials. The phosphate ingredient can constitute from about 0.25 to about 20 percent of the end product; but, as in the case of the "acid reaction" versions of these processes, phosphate percentages of from about 0.25 to about 2.0 percent are highly preferred when such auxiliary binder materials are employed. Consequently, such a simple clay and auxiliary binder component catalyst might be comprised of from about 5.0 to about 40 percent of an auxiliary binder material, 0.25 to 20 percent phosphate and from about 40 to about 94.75 weight percent clay.

Another preferred "alkaline reaction" version of applicant's process is designed to produce attrition-resistant clay/phosphate/catalyst matrix particles. That is to say that alkaline reaction versions of these processes can be used to incorporate catalyst particles into a binder which, in effect, constitutes a continuous phase comprised of the clay and phosphate components. This embodiment of applicant's process will generally comprise: (1) preparing a clay slurry having from about 20 to about 50 weight percent of a clay ingredient, (2) bringing the clay slurry to a pH of from about 13.0 to about 10.0, (3) forming a binder formulation by mixing an amount of an acid and an amount of a monobasic, dibasic and/or tribasic phosphate compound into the clay slurry which are collectively sufficient to form a viscous, clay/phosphate slurry having a pH from about 4.0 to about 8.0 and to provide a quantity of phosphate which is such that the slurry will be comprised of from about 2 to about 20 weight percent of phosphate, (4) mixing catalyst particles into the clay/phosphate compound slurry to form a clay/phosphate/catalyst particle slurry having a quantity of catalyst particles which is such that the catalyst particles of the attrition-resistant clay/phosphate/catalyst matrix ultimately made from this process will contain from about 3 to about 60 weight percent of said catalyst particles, (5) drying (by spray drying, etc.) said clay/phosphate compound-/catalyst particle slurry to produce finely divided, solid particles, and (6) calcining the finely divided solid particles to produce attrition-resistant binder/catalyst matrix particles which contain between about 3 and about 60 weight percent of catalyst, about 2 to about 20 weight percent of phosphate and about 20 to about 95 weight percent clay. For reasons somewhat akin to those suggested for the "acid reactions" used to create active catalyst containing matrices, such alkaline reaction processes for producing active catalyst-containing matrices should not introduce the catalyst particles into the slurry while it is in an "extreme" condition with respect to its pH level. That is to say that, in general, the catalyst should not be introduced into the slurry while it is at its initial, e.g., 14.0–10.0 (that is "extreme") pH level, but rather the catalyst, in general, should be introduced only after the ammonium/aluminum phosphate complex units are formed and only after the pH level is adjusted (using any suitable source of acidity, e.g., a mineral acid, but especially phosphoric acid) into a more "neutral", i.e., 4.0 to 8.0 (and preferably 6.5–7.0) pH level.

Auxiliary binder component-containing formulations also can be employed in these "alkaline reaction" versions of applicant's process. These embodiments introduce catalyst particles into an auxiliary binder component-employing overall binder formulation, and hence into the matrix particles made from them. By way of example, such a process might comprise: (1) preparing a clay slurry having from about 20 to about 50 weight percent clay; (2) bringing the clay slurry to a pH of from about 14.0 to about 10.0; (3) mixing an amount of a phosphate-containing compound, an acid (preferably phosphoric acid) and an auxiliary binder material into the clay slurry which are collectively sufficient to form a clay/phosphate/auxiliary binder material slurry having a pH from about 4.0 to about 8.0 and to provide a quantity of phosphate and auxiliary binder material which is such that the end product particle will comprise from about 5.25 to about 40 weight percent of the resulting attrition-resistant binder material; (4) mixing catalyst particles into the clay/phosphate compound slurry to form a clay/ phosphate/catalyst particle which is such that the catalyst particles of the attrition-resistant clay/phosphate/catalyst matrix ultimately made from this process will contain from about 3 to about 40 weight percent of said catalyst particles; (5) drying said clay/phosphate compound/catalyst particle slurry to produce finely divided, solid particles; and (6) calcining the finely divided solid particles to produce attrition-resistant binder/catalyst matrix particles which contain between about 3 and about 40 weight percent of the catalyst component, between about 20 and about 91.75 weight percent clay and from about 5.25 to about 40 weight percent of an auxiliary binder component which has a phosphate content which is capable of providing the end product attrition-resistant particles with a phosphate content of at least 0.25 weight percent. Here again, the preferred phosphate percentage is 0.25 to 2.0 percent, but percentages ranging from about 0.25 to 20.0 can be employed. The remainder of the auxiliary binder component will comprise a "glue" type binder such as alumina, silica, silica-alumina, silica-magnesia, etc. As was previously noted, such auxiliary binder materials may also be thought as being any binder material other than the clay being utilized in that particular particle. Consequently, the particles resulting from such formulations will be comprised of from about 20 to about 91.75 percent clay, from about 0.25 to about 20 percent phosphate, from about 5 to about 20 percent auxiliary binder material and from about 3 to about 40 weight percent active catalyst particles.

The "most preferred" procedures for carrying out applicant's process by coming from the "basic side" (e.g., 14.0 to 10.0) of the pH scale also may include further modifications such as: (1) creating a kaolinite clay slurry by diluting a kaolinite clay slurry having about a 70% clay concentration to about a 40% concentration by the addition of water to the 70% slurry, (2) bringing the resulting clay/water slurry to a pH of from about 14.0 to about 10.0 by the use of ammonium hydroxide, (3) introducing a phosphate-containing compound (e.g., monobasic ammonium phosphate, dibasic ammonium phosphate, etc., or most preferably mixtures thereof) into the clay slurry in quantities such that the phosphate component of the slurry represents from about 6.0 to about 12.0 weight percent of the slurry and (4) introducing sufficient phosphoric acid into the clay/phosphate-containing compound slurry to bring its pH down to a level from about 4.0 to about 8.0. Again, the use of phosphoric acid is particularly preferred for this purpose since it performs the dual functions of lowering the pH of the alkaline system to the desired 4.0 to 8.0 level while contributing to the provision of the phosphate which is needed to attain the 2 to 20 (or 0.25 to 20) weight percent phosphate proportions in the resulting particles. These most preferred versions also may take into account the concern for the fact that if a catalyst is employed, it should not be introduced into the slurry while it is in its extreme (14.0–10.0 pH) alkaline state; but rather the catalyst should be introduced into the slurry only after it is brought to a 4.0 to 8.0 pH level, preferably through the use of phosphate-containing and/or acid ingredients such as ammonium phosphate and phosphoric acid.

As "optional", but by no means mandatory, steps, both the acid reaction and alkaline reaction versions of applicant's overall processes may further comprise: (1) using only phosphoric acid to adjust a slurry to a desired pH level, (2) placing "optional ingredients" such as viscosity agents, gas evolution agents and/or density providing materials in the slurry, (3) vigorously mixing the appropriate reactants—right up to the moment of the spray drying step—in order to help preserve an intimately mixed state of the original ingredients, (4) drying the products of the spray drying in a distinct drying step before calcining them (5) use of mixtures of clays to make up the clay/phosphate slurries, (6) use of mixtures of phosphate-containing compounds, (7) use of mixtures of acids, (8) use of clay particles of from about 0.2 to about 0.3 microns in average diameter, (9) use of one or more fluids (e.g., water and alcohol) in order to form at least a portion of any given clay slurry and (10) employing the temperature conditions existing in a catalytic cracking reaction system to supply the heat and atmosphere necessary to perform applicant's calcination step.

As was previously noted, the binder matrices made by most of applicant's processes—for the most part—will tend to be catalytically inert. However, they can be "designed" to be catalytically active; for example, use of certain catalytically active kaolinite clays (halloysite, rectorate, etc.) will tend to produce binders having their own inherent catalytic activities. On the other hand, use of other, less active clays will generally produce binders which are catalytically inert. For example, use of kaolin clay will generally produce catalytically inert binder materials. Generally speaking catalytic "inertness" should be regarded as a "virtue" of applicant's binder formulations. Moreover, inert binder systems may be rendered catalytically active by certain well known techniques such as "impregnation" of an inert binder with a catalytically active material.

With respect to the subject of "impregnation", it should at least be mentioned in passing that many metallic atoms, such as those of vanadium, can be associated with any binder particles or binder/catalyst particles produced by the methods of this patent disclosure by the use of impregnation techniques known to the art. Thus, by way of a more detailed example of such impregnation techniques, vanadium pentoxide $V_2O_5$, in oxalic acid, could be associated, by impregnation procedures, with applicant's binder material(s) or binder/catalyst matrix material(s) after they have been calcined. The resulting vanadium impregnated matrix can then be re-dried (preferably at about 250.F from about 60 minutes to about 240 minutes) and then re-calcined (preferably for about 180 minutes at about 1350° F.). During the second calcination the oxalate ingredient will break down to $CO_2$ and steam which are each driven off as gases and thereby leaving the vanadium as a cation, $VO_2^+$. Impregnated binder particles made by such impregnation techniques preferably will comprise from about 0.5 to about 4 percent vanadium by weight, with about 2 percent by weight being a particularly preferred proportion.

Applicant's processes—and the binder materials made from them—are especially useful in binding catalyst particles together into more appropriately sized catalytically active particles. Indeed, this is probably the most preferred use for applicant's binder materials. The types of catalytically active ingredient(s) which can be used in applicant's binder formulations can vary greatly. Amorphous clay materials (e.g., those containing alumina), faujasites, naturally occurring zeolites, synthetic zeolites such as ZSM-5, low-soda exchanged Y-zeolites or ultra-stable Y-zeolites as well as mixtures of such materials are but a few of the more common kinds of catalysts which can be incorporated into applicant's binder systems. The clays, phosphate-containing compounds and acids which can be employed in the practice of this invention also can vary greatly. Various specific examples of formulations in which these various materials are used will be given in more detail in the DESCRIPTION OF THE PREFERRED EMBODIMENTS section of this patent disclosure. For now, however, only some of the more pronounced general attributes and uses of the various clays, catalysts, phosphate-providing compounds and acids which can be used in these processes need be mentioned.

CLAYS

The clay ingredients which can be employed in applicant's process can vary considerably. For example, a wide variety of kaolinite clays (e.g., kaoline, halloysite, rectorate, etc.) montmorillionite clays (e.g., natural montmorillionite as well as synthetic montmorillionite clays), sepiolite clays and attapulgite clays can be employed. Of these, the kaolinite clays and most particularly kaolin clays, are preferred—if for no other reason than their low cost and "universal" ability to bind so many different kinds of catalyst particles without entering into undesired chemical reactions with such catalysts.

MOST PREFERRED CLAYS

Some particularly preferred embodiments of this invention involve the use of certain "delaminated clays" to control the density of the matrix and/or their use to raise the solids content of the spray dryer feed material. For the purposes of this patent disclosure use of the expression "delaminated" clays can also be taken to mean that such clays have been both "delaminated" and "calcined." Indeed, the best results are obtained when a clay has been exposed to both a delamination procedure and then a calcination procedure (e.g., heating for at least 30 minutes at a temperature of at least 1000° F. These delaminated clays can be used in either the "acid versions" or "alkaline versions" of applicant's processes. Before launching into the details of these particular materials, however, it probably would be worthwhile to further describe the general nature of delaminated clays.

To this end, it might first be noted that individual clay particles usually have an average particle size of about 0.25 microns. Each is composed of "sheets" of silica-alumina loosely bound together in a layered structure. The individual sheets are usually about 0.713 nanometers thick. Thus an individual clay particle might consist of about 3000 sheets or layers. The individual layers are bound together by relatively weak electrostatic forces. In the clay industry the analogy of a "book" is often used to describe a clay particle. That is to say that the "book" is analogous to the clay particle and the "pages" are analogous to the individual sheets of silica-alumina.

In any case, the process of "delamination" of a clay particle is simply one of separating the "book" into its individual "pages". Usually this is accomplished by mechanical means such as a disc mill or other type of grinding apparatus. Next, it should be noted that, with regard to the herein described processes, even after clay particles are delaminated, they still will retain the property of being able to be bound together by the phosphoric acid ingredient of applicant's process in order to form attrition resistant binders There is, however, one striking difference. The viscosity of the resulting delaminated (and calcined) clay-phosphoric acid slurry is however greatly reduced as compared to those slurries produced by clays which are not delaminated. It is therefore possible to make a significant reduction in the water content of such slurries and thus make a large increase in the production rates from a given spray dryer unit. For example in the case of a ZSM-5 catalyst, it is possible to double the production rate simply by using delaminated clay in place of regular (i.e., non-delaminated) clay.

A second beneficial result of using delaminated clay is an improved bulk density of the clay matrix. A typical value for FCC catalyst would be 0.75 grams/cc. Bulk density is of interest because it provides a convenient correlation with particle density. Thus, for a given diameter particle, the higher the density, the greater the mass of the particle, and the easier it is to retain the particle in the FCC system. Those skilled in this art will appreciate that the bulk density of a catalyst is determined by pouring a known weight of the material into a graduated cylinder and measuring the volume. The density is simply the weight divided by the volume and is usually reported as grams/cc.

In discussing the concept of the densities of such materials, it also should be noted that there are two "void volumes." The first of these is the voids between the individual particles; that is to say the "inter-particle" voids. The second is the void volume inside a given particle i.e., "intra-particle" voids. The inter particle voids are largely a function of how the particles pack together. The primary factors that influence this are particle size, shape and particle size distribution. Having noted this, it should next be noted that, for the most part, applicant's processes are not primarily concerned with controlling the bulk density of these materials by altering the inter-particle voids. That is to say that the primary thrust of the preferred embodiments of the herein described processes seek to reduce the void volume within the individual particles i.e., the intra-particle voids.

In order to better understand these concepts, one might visualize clay matrices as being a random arrangement of large clay particles of about 0.25 microns diameter that are, in turn, bound together by phosphate links to form a larger particle which is about 75 microns in diameter. A useful analog in understanding this point is to regard the clay particles as analogous to children's blocks. If one could stack them into a three dimensional array where each block was exactly alongside another block in a face-to-face arrangement, one would have a "particle" with zero void volume and thus maximum density. By way of contrast, if one took all of the blocks and simply stacked them in some random array, then one would have void spaces between the individual blocks and the density of the overall "particle" would go down. Thus, one can raise particle density either by stacking the clay particles in a more orderly manner, or by filling their intra-particle voids with another material.

Applicant's approach was through the latter path. To this end, the most important property of the filler material is that it be small enough to fit between the voids of the larger clay particles. To be more specific, applicant has found that delaminated and calcined clay materials make particularly preferred materials for filling in these particular void spaces. It also might be noted in passing that when applicant first tried to make a matrix with a higher density simply by mixing delaminated clay with regular clay, the results were not particularly encouraging—the density did not change. Further investigation showed that delamination of a clay, in and of itself, does not completely destroy the charges on the edge of the clay sheets. As a result of this, the delaminated clay was simply being incorporated into the random stacking of the larger particles. In seeking to change this particle packing mode, applicant calcined the delaminated clay at a high temperature. It was found that this calcining step very admirably served to destroy the charge on the edge of the clay (e.g., kaolin) sheets. The delaminated (and calcined) particles effectively filled the voids between the larger clay particles. Consequently, the density of the overall particle was significantly increased. Certain experimental data summarizing these findings are given in later portions of this patent disclosure (e.g., see Examples 21 and 22 as well as TABLE 1).

PHOSPHATE-CONTAINING COMPOUNDS

The phosphate-containing compounds used for applicant's process are most preferably selected from the group consisting of monobasic phosphate compounds, dibasic phosphate compounds and tribasic phosphate compounds. Because of their ready availability and relatively low costs, monobasic ammonium phosphate, dibasic ammonium phosphate and tribasic ammonium phosphate and/or phosphoric acid are particularly preferred for applicant's purposes. That is to say that other phosphate-containing compounds can be employed in the practice of this invention, but for the most part they are, to varying degrees, much less preferred from various technical and/or cost points of view. It also should be emphasized that applicant has found that mixtures of the above noted phosphate-containing compounds are especially preferred. For example, mixtures of monobasic ammonium phosphate and dibasic ammonium phosphate are particularly well suited for adjusting applicant's "acidic reaction" clay slurries from an initial 1.0 to 3.0 pH level to a 4.0 to 8.0 pH level. And, here again, mixtures of monobasic or dibasic ammonium phosphate and phosphoric acid are particularly effective in lowering applicant's "alkaline version" slurries from their initial 14.0 to 10.0 pH levels to those 4.0 to 8.0 pH levels which are better suited for the introduction of catalyst particles.

It should also be noted in passing that the terminology used to describe the ammonium phosphate compounds used in these processes varies somewhat in the chemical literature. For example: (1) monoammonium acid orthophosphate is often referred to as "monobasic ammonium phosphate", (2) diammonium acid orthophosphate is often referred to as "dibasic ammonium phosphate", and (3) triammonium orthophosphate is sometimes referred to as "tribasic ammonium phosphate." The terminology used in this patent disclosure may likewise vary according to these two nomenclature systems without implying a difference or distinction in the materials themselves.

ACID AND ALKALINE INGREDIENTS

The acids, other than phosphoric acid, which can be used to obtain applicant's original 1.0 to 3.0 pH levels, can be virtually any mineral or organic acid capable of supplying the "acidity" needed to bring a slurry to a desired pH level. Nitric acid is, however, particularly preferred for such purposes. In the same vein, virtually any strong base can be employed to obtain the original 14.0 to 10.0 pH level in the alkaline version of applicant's process, but ammonium hydroxide is particularly preferred for this purpose because of its ready availability and relatively low cost compared to many other strongly alkaline compounds. However, sodium generally constitutes a highly undesirable ingredient in most catalyst particles. Hence, use of sodium hydroxide is not recommended for producing the initial high (e.g., 14.0–10.0) alkaline conditions. Finally, before leaving the discussion of the alkaline versions of applicant's processes, it should be pointed out that any mineral or organic acid can be used to lower the alkaline clay slurry from its initial 14.0 to 10.0 pH level to the desired 4.0 to 8.0 level; however, here again, phosphoric acid is particularly preferred for this purpose because not only does it supply the slurry system with the acidity required to lower the pH of the system, it also supplies phosphate ions and thereby supplements the phosphate supplied by any other phosphate-containing compounds used in this version of the process.

CATALYSTS

Amorphous Catalysts

Applicant's processes can be used to bind a wide variety of amorphous catalyst materials. This ability is particularly important to certain petroleum industry applications of this invention since amorphous catalysts are so widely used to crack those higher molecular weight compounds that cannot be cracked on the surface of zeolitic components of a catalyst. Within this group of amorphous catalytic materials there are two generally recognized subgroups; synthetic catalysts and naturally occurring catalysts, in particular various kinds of catalytically active clays. In the synthetic amorphous catalyst category, various alumina type materials are probably the most important from the commercial point of view. They are usually made by so-called "gel reactions" of the types previously noted, but especially those involving alumina and/or various "activated" aluminas. These gel reaction alumina products have the property of being dispersible in monovalent acids. They also are characterized by their significant surface areas, e.g., greater than 150 square meters per gram, and by their very significant surface acidity. In the case of aluminas produced by such gel reactions, the surface acidity of these materials may be increased even further by adding small amounts of silica to the structure. However, it should again be emphasized that applicant's reactions should not be regarded as being analogous to such prior art gel reactions. As was previously noted, they are qualitatively different in several respects.

As far as "catalytically active clays" are concerned, the most important to applicant's invention are those various members of the kaolinite group which are catalytically active, e.g., halloysite, rectorate and hectorite. Various montmorillonite clays also can be used for some catalytic purposes. It also should be noted that in addition to naturally occurring clays, synthetic clays such as synthetic montmorillonite and certain of the so-called pillared clays also can be employed for various catalytic purposes and, hence, may be incorporated into applicant's binder formulations. Those catalytically active clays such as sepiolite and attapulgite clays used as metal scavenging catalyst in petroleum refining operations also can be easily bound by applicant's binder formulations. Therefore, any of these clays might be used in applicant's binder formulations if, in fact, their catalytic activities were desired. That is to say they could be used as applicant's clay ingredient(s) and/or they could be used as applicant's auxiliary binder materials, i.e., along with those alumina, silica, alumina-silica, etc. "auxiliary binder materials" previously discussed.

Synthetic Faujasites

The synthetic faujasites are a most important group of crystalline catalytic materials which also can be readily bound in applicant's binder matrices. This group generally comprises materials having silica to alumina ratios from about 3.0 to 100. Usually the lower silica/alumina ratios, e.g., 3.0 to 6.0, are made by direct crystallization. Materials with higher silica to alumina ratios may be prepared by removing alumina from the crystal lattice, e.g., by steaming at elevated temperatures and by acid leaching or a combination of these procedures. Alumina may also be removed from these materials by the use of chelation agents. In still other processes for the production of such catalytic materials, alumina can be removed from their lattices and silica can be inserted into the lattice in place of said alumina. In all such cases, however, these crystalline materials have small particle sizes and, hence, can be agglomerated into large particles through the use of applicant's invention.

Indeed, as was previously noted, there is an extremely large variety of catalytically active materials that have the common property that they are too small in particle size to be used directly in commercial operations and, hence, require some type of a binder to hold their particles together in larger, attrition-resistant particles and especially those sized in the range of about 60 to about 100 microns (and more preferably from about 60 to about 80 microns). For the general purposes of this patent disclosure the term "small" crystalline catalyst ingredients can be taken to mean those catalytic particles having average particle sizes of less than about 5 microns. In any case, all such "small" particles must be formed into larger particles in order to be made useful as cracking catalysts. Again, applicant's binder formulations are particularly well suited to production of larger particles through spray drying operations, e.g., microspheroidal sized units having average diameters of from about 60 to about 100 microns are usually produced by such spray drying procedures. However, as was previously noted, particles of less than about 20 microns are not preferred for use in "fluid" processes; not because they will not work catalytically, but rather because they are subject to cyclone-induced elutriation losses.

Synthetic Zeolites

Synthetic zeolites represent another large group of catalysts which are widely used in the petroleum processing industry. They are normally prepared by using organic templates that alter the crystal habit of the crystallite and thus imparting desirable catalytic properties to the resulting material Perhaps the best known example of such synthetic zeolite materials is ZSM-5. There are, however, well over a hundred other zeolites in this general category. Moreover, the groups of crystalline materials designated as "mordenites" and as "beta zeolites" also are of considerable commercial importance and, hence, are suited for inclusion in applicant's binder systems. Those skilled in this art also will appreciate that, within any given type of crystalline zeolite there also may be further distinctions based upon variations in silica-to-alumina ratios or other parameters that influence the catalytic activities of such materials. Suffice it to say that any of these synthetic zeolites can be bound together into microspheroidal or extrudate particles through the use of applicant's binder formulation.

Now, having more fully identified the chemical nature of the ingredients which can be used in applicant's various processes, it again should be noted that the relative proportions of these ingredients are generally expressed throughout this patent disclosure in terms of their weight percentage contributions to the "solid" ingredients ultimately contained in the final product attrition-resistant matrices. That is to say that, unless otherwise noted, the percentages expressed herein usually do not include the weight of such ingredients as: (i) the liquid medium (e.g., water, alcohol, etc.) used to make up the slurries in which the clay particles are placed, (ii) the acids other than phosphate-providing portions of phosphoric acid which are employed in making up the binder formulations or (iii) the non-phosphate components of the phosphate-containing compounds employed in these processes.

For example, with respect to applicant's preferred phosphate-containing compounds, the herein described percentages would not include the ammonium component of any mono, di and/or tribasic ammonium phosphate compound(s) used to give a binder material its 0.25 to 2.0 percent, or its 20.0 to 19.75 percent, phosphate proportion. Thus, for example, the 2–20 weight percent phosphate supplied by an ammonium phosphate compound would include only the phosphate components of these molecules and not their ammonium components. These "weight neglecting" assumptions are not as artificial as they might appear at first because applicant's spray drying and calcining steps will tend to completely drive off any volatile ingredients or compound components. Indeed, the ammonium phosphates are highly preferred phosphate compounds because their ammonium components are driven off the particle by the calcination procedures of these processes. In other words the calcination step would completely drive off the ammonium component of these molecules, but the phosphate components will remain in the end product matrices. By way of further example of this point, the spray drying and/or calcination steps would each serve to drive off any fluid (such as water, alcohol, etc.) used in making up the clay slurry as well as the ammonium component of any ammonium phosphate ingredient(s). In any event, applicant has elected to express the relative proportions of the ingredients of this patent disclosure on this "dry weight" basis.

Any other ingredients in applicant's matrices, if indeed any are employed, will generally comprise only relatively small proportions (e.g., from about 1 to about 10 weight percent of the overall resulting matrix). In discussing these relative proportions with respect to catalyst particle-containing matrices, it also should be noted that any other ingredients (i.e., those other than the clay, phosphate, auxiliary binder material and catalyst particles) are better thought of as constituting a portion of the weight of the "non-phosphate" ingredient(s) rather than a portion of the weight of the remainder of the resulting matrices. Thus, applicant's more preferred simple binder formulations would contain from 2–20 percent, and more preferably from 6 to 12 weight percent of a phosphate component, even if ingredients other than clays were employed; in other words, the 2–20 percent phosphate proportion should not be "sacrificed" in order to introduce any other potential ingredients (e.g., viscosity agents, gas forming agents, density-providing particles, etc.) into the resulting matrix. Looking at this requirement from another prospective, it might also be said that applicant's 2–20 percent phosphate requirement will only be "sacrificed" only if an "auxiliary binder component" is also employed. In such cases the "auxiliary binder component" can be thought of as being a part of an overall clay/auxiliary binder component system which can be used in its own right or used to bind active catalyst particles together into more appropriately sized units. However, in all cases applicant's threshold 0.25 percent phosphate requirement should never be "sacrificed" in order to introduce any other potential ingredient. In general such other ingredients can replace a portion of the clay, so long as the resulting clay proportion does not fall below about 20 percent in the end product particles.

Additional Theoretical And Practical Considerations

Several preferred, but optional, steps can be incorporated into these processes, one of these involves further drying of the products of the spray drying, extrusion, etc. step by a separate and distinct drying (or desiccating) step in order to obtain more completely "anhydrous" forms of the particles produced by the spray drying, etc. Such anhydrous forms of the products of the drying step can then be calcined in the same manner as those products received directly from applicant's drying step. Such additional drying may, in many cases, serve to better "freeze" the ingredients in the homogeneous state in which they originally existed in the reaction mixture. That is to say that the "solid" particle product of applicant's spray drying step, flashing, etc., may then be, as an optional process step, desiccated or dried in a manner other than the drying which is inherent in the drying, spray drying or flashing step in order to remove any remaining traces of the liquid medium which may be still present in the interstices of the particles and/or associated with the particulate product of the spray drying step as water of hydration. Drying times for this distinct drying step will normally take from about 0.2 hours to about 24 hours at temperatures preferably ranging from about 200° F. to about 500° F. (at atmospheric pressure), but in all cases, at temperatures greater than the boiling point of the liquid medium employed (e.g., greater than 212° F. in the case of water). In any case, such drying will usually suffice to produce a completely anhydrous, product. That is to say any remaining liquid medium which may have been physically associated with and/or loosely chemically bonded with (e.g., as water of hydration) the solid phase product of the volatilization step, whether it be, at this point in the overall process, in a crystalline lattice form, or in an amorphous solid form, or even in a gel form, can be driven off by a separate and distinct desiccation, drying, etc. step(s). In any event, the result of applicant's use of such additional drying or desiccation step(s) will be an aggregate of particles of anhydrous ingredients which are not able to depart from their original physical identity as a homogenous distribution of the ingredients in the original reaction mixture.

After such drying or desiccation—if it is in fact employed—it remains only to take the solid particles and calcine them. Some of the chemical reactions which may be taking place as a result of such calcination procedures have already been described. Therefore, suffice it to say that the final step of this process seeks to produce those temperature conditions which are needed to vitrify the products of the clay/phosphate reaction which took place when the phosphate-containing compound(s) were introduced into the clay slurry. The calcination step also serves to drive off, as gaseous materials, the most volatile (e.g., ammonium, water, etc.) components of the solid particles produced by the spray drying and thereby leaving only those elements which are desirable in forming attrition-resistant binder materials or binder/catalyst materials. Such calcination is preferably accomplished by calcining the particle products of the spray drying step (or the extruding step) at temperatures ranging from about 1,000° F. to about 1,950° F. (at atmospheric pressure) for from about 60 minutes to about 240 minutes, and most preferably at about 1,350° F. for about 180 minutes. This calcination step can be carried out in those calcination apparatus known to this art which are specifically designed for such purposes. This is the preferred procedure.

It should also be understood that the temperature conditions (and perhaps even the atmosphere content) of a catalytic reactor unit may themselves provide applicant's calcination step. That is to say that the calcining can be carried out in a catalytic unit which employs the attrition-resistant binder particles. Indeed, in some versions of the herein described processes, the particulate products of a spray drying step may be injected directly into an operating catalytic unit as those particles are formed. Thereafter, the particles will be "calcined" by the temperature conditions existing in the catalytic unit as it carries out some other catalytic task. Again, this could constitute a preferred procedure if the binder formulations of patent disclosure are manufactured in the same plant where they are used and where the catalytic unit into which they are introduced has appropriate operating temperatures.

Spray drying procedures well known to this art will generally serve as the fastest, most efficient way to dissipate the liquid media in the clay slurry so as to "fix" the various ingredients in a solid matrix (again, extrusion techniques are less preferred, but still operable). That is to say that such "fixing" or "freezing" of the ingredients in a homogenous mixture is preferably accomplished by rapid dissipation of the liquid medium under the conditions of spray drying wherein the total mixture is atomized to small liquid spherical droplets in an atmosphere of sweeping heated gases (which may be air) with a concomitant rapid evaporation of the liquid medium at the boiling point of whatever liquid phase is present at nominally atmospheric pressure. Such spray drying operations can be carried out by any number of techniques well known to this art (e.g., such as those disclosed in the 635 patent which is, in its entirety, incorporated by reference into this patent disclosure) in order to produce MS (microspheroidal) particles in a range of sizes, e.g., 60–80 microns and most preferably such that essentially all such particulate materials resulting from said spray drying (and from subsequent calcining) will be retained by a Standard U.S. 200 mesh screen and essentially all will be passed by a Standard U.S. 60 mesh screen.

By way of further clarification, the spray drying equipment which can be used in applicant's process may employ at least one restriction or high pressure nozzle having a diameter in the range from about 0.01 in. to about 0.2 in. and preferably from about 0.013 in. to about 0.15 in. The pressure upstream of such a high pressure nozzle may range from about 400 psig. to about 10,000 psig. and preferably be maintained between about 400 psig. and about 7,000 psig. The material to be spray dried is sent through the nozzle system into a space or chamber. The pressure in the space or chamber downstream from the nozzle system is lower than that immediately up-stream of the nozzle and is typically in the range from about 0 psig. to about 100 psig., and preferably be from about 0 psig. to about 20 psig. Once through the nozzle, the material may be contacted for a relatively short time, e.g., from about 0.1 seconds to about 20 seconds with a gas stream which is at a temperature of from about 200° F. to about 1500° F. and preferably from about 200° F. to about 750° F. in order to complete the spray drying step. The gas stream which may be, for example, air or the flue gases from an in-line burner (used to provide a gas stream having the proper temperature) or a substantially oxygen-free gas, may flow co-current, counter-current or a combination of the two relative to the direction of flow of the material to be dried. The spray drying conditions, such as temperatures, pressures and the like, may be adjusted because of, for example, variations in the composition of the material to be dried in order to obtain optimum results which are achievable through routine experimentation.

An alternative to the high pressure nozzle described above is a so-called "two-fluid" nozzle in which the material to be dried is dispersed by a stream of gas, typically air. Such a two fluid nozzle has the advantage of being able to employ a low operating pressure, e.g., from about 0 psig. to about 60 psig. for the material to be dried and from about 10 psig. to about 100 psig. for the dispersing gas. The dispersing gas may also function as at least a portion of the drying gas stream. The various operating parameters noted above may be systematically varied in order to achieve the desired particle size. For example, in order to minimize contact between the chamber walls and wet material, the chamber downstream from the nozzle system can be made large in size, e.g., from about 4 to about 30 feet in diameter and from about 7 to about 30 feet long, often with an additional conical shaped portion for convenient withdrawal of the spray dried material. The spray drying apparatus may also include separation means, e.g., cyclone separators in the outlet gas line to recover at least a portion of the material entrained in this stream.

One particularly useful variation on the idea of adjustment of the solids content of the clay slurry fed to the spray dryer might include the use of additional amounts of a liquid medium (or .media), added to the liquid medium (or media) originally present in the clay slurry. For example, many commercially available clay slurries are comprised of 70% clay and 30% water. In some of the more preferred versions of this process, the clay concentration is lowered to about a 40% clay concentration before the phosphate-containing compound is introduced into the clay slurry. It also should be noted that the herein described weight proportions for the liquid media do not count any additional liquid ingredients such as thickening agents, if such additional liquid agents are in fact present in the total slurry. The presence and proportions of such preferred, but nonessential, ingredients, e.g., gas evolution promoters and/or viscosity agents such as starch, STEREOTEX®, gum arabic, etc.—if used—should not constitute more than about 10% by weight of the total slurry. Such optional ingredients also may include relatively small amounts of certain other optional or "adjunct" materials. For example, "weighing agents" may be used in the practice of this invention in order to impart certain density characteristics to the resulting particles. That is to say that such materials may be employed more for their effect on the density of the resulting material than for their binding capabilities and/or their catalytic activities.

Some other preferred variations of applicant's fundamental process may involve the use of various techniques to aid in the "freezing" of the ingredients otherwise accomplished by applicant's spray drying step. Such auxiliary techniques for aiding this "freezing" might include: (1) use of organic thickening agents, (2) use of nonorganic thickening agents such as alumina, (3) adjustment of the solids content of the clay slurry fed to the spray dryer and/or (4) aging of the clay/phosphate reaction mixtures before carrying out the spray drying step.

Other objects and/or advantages to applicant's process and binder materials will be made more apparent from the following drawings and detailed descriptions regarding the experimental programs used to establish the scope of applicant's invention.

DESCRIPTION OF THE DRAWINGS

FIG. 2 is a composite of a group of curves representing systems having a representative catalyst (e.g., ZSM-5) as a part of the overall particle. Here again, none of the binder systems which generated this "composite" curve had an auxiliary binder ingredient.

Generally speaking, both FIGS. 1 and 2 indicates that: (1) phosphate concentration levels of less than about 2 percent by weight of the catalyst-containing binder do not produce acceptable attrition-resistance levels, (2) phosphate concentrations between about 6 and 12% are preferred and (3) phosphate concentrations above about 12% and certainly after about 20% again provide only marginal improvements in attrition-resistance. FIGS. 1 and 2 also tend to suggest that the lower end (2%) of this scale is technical in nature while the upper end (20%) is as much an economic constraint as it is a technical limitation for catalyst particle container materials.

DESCRIPTION OF THE PREFERRED EMBODIMENTS

Figure 1:
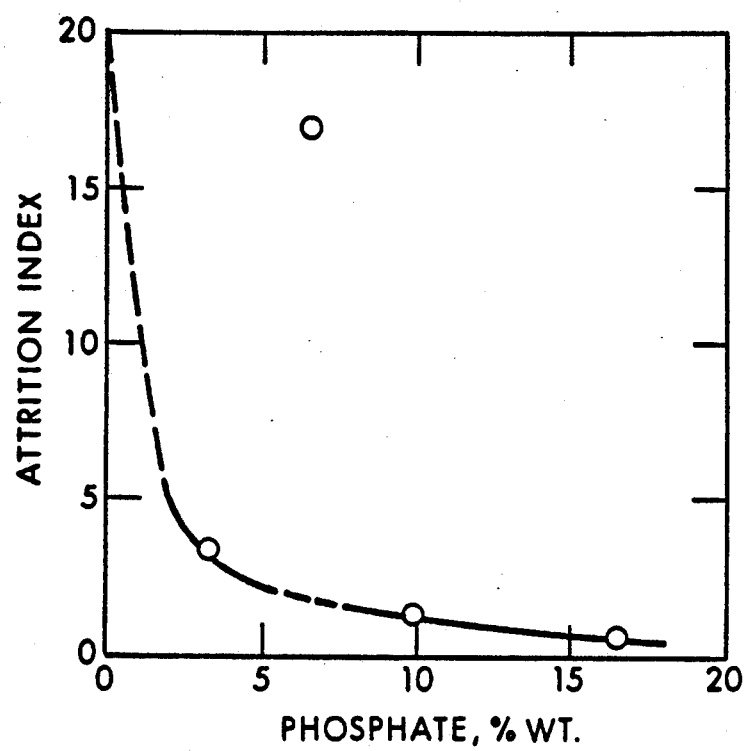
FIG. 1 graphs an attrition index versus the weight percent of phosphate for a "composite" of several curves having very similar features. That is to say this curve is a kind of "average" curve for several representative systems. The systems depicted were clay-phosphoric acid binder systems which did not include active catalyst particles as a part of their makeup. The attrition-resistance in both FIGS. 1 and 2 was measured according to the method proposed in ASTM test D-32.02.06, Draft 5a, which hereinafter more fully described In the attrition scale depicted in the ordinate, a reading of more than about 7 should be considered as unacceptably "soft."
Figure 2:
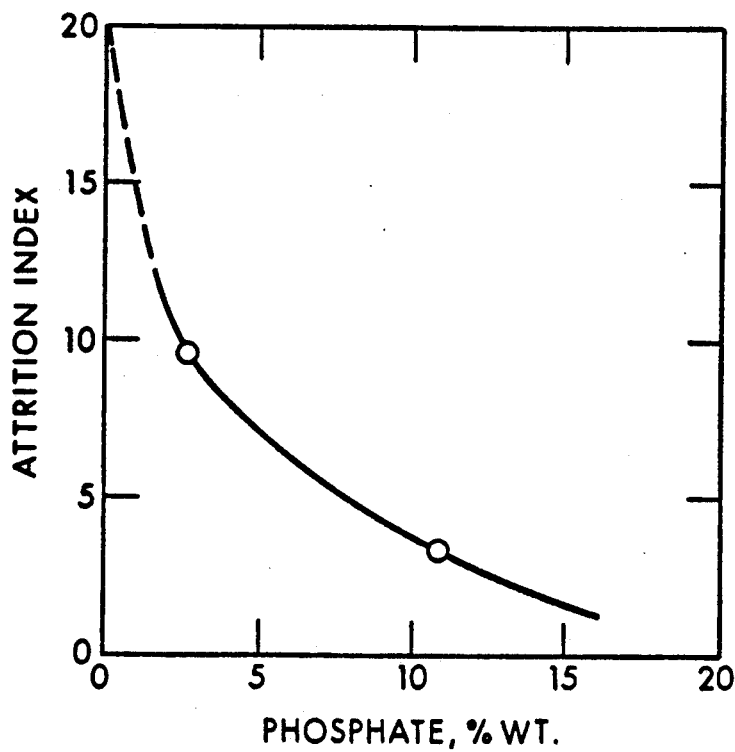
FIG. 2 graphs the same attrition index versus the weight of phosphate for another "composite" curved derived from several representative curves having similar features. However.

As was previously noted, applicant believes that the "acid reaction" versions of the herein described processes involve an adjustment of the pH of the slurry (e.g., to a pH level of from about 10 to about 3.0) so that the aluminum components of a given clay lattice will no longer be covalently bonded to oxygen, but rather will be converted, in the acid environment, to a cationic condition (e.g., $Al^{++}$) that encourages bonding of the aluminum to the phosphate oxygen, and thereby creating the desired ammonium aluminum phosphate complex units which are particularly well suited to subsequent vitrification steps. In effect, the acidification step tends to put positive charge on the amphoteric aluminum components of the clay.

However, applicant also has established that if the clay is exposed to extremely alkaline conditions (e.g., pH levels of from 10.0 to 14.0) the resulting particles also will posses the desired attrition-resistant qualities. This ability also follows from the amphoteric nature of alumina in such clays. Thus it would appear that applicant's acidic preparation step puts positive charges on the clay while the alkaline preparation step puts negative charges on the clay. That is to say that the experimental evidence all points to the fact that either of these techniques will produce the desired results so long as the pH produced by it is "extreme" (e.g., 1.0 to 3.0 or 10.0 to 14.0). Again, however, the "acid reaction" versions of applicant's processes are preferred. That is to say that the need for creation of the "extreme" acidic conditions (e.g., creation of a pH of from about 1.0 to about 3.0) as well as the "extreme" alkaline conditions (e.g., creation of pH levels from about 1 4.0 to about 10.0) in the clay slurry have been verified by applicant's experimentation program even though the theoretical basis for the alkaline reaction versions of applicant's processes are not as well understood. In any case, applicant has found that creation of either of these extreme pH conditions will serve to produce more favorable reactions between a clay and a phosphate compound which is subsequently introduced into the herein described clay slurries. Indeed, applicant's experimental program has clearly established that if these extreme pH conditions are not created in the slurry before the phosphate is introduced into said slurry, the resulting clay/phosphate or clay/phosphate/catalyst particles will have rather poor attrition resistance qualities.

For example, applicant has found that if a slurry is simply initially created to have a middle pH value of from about 6.0 to 8.0 i.e., without first experiencing either of the "extreme" pH conditions required by applicant's process—then the resulting particles will have rather poor attrition-resistance qualities. However, applicant's experimental program also clearly established that when catalytic particles are used, they should not be introduced into either an extremely acidic (1.0–3.0) or an extremely basic (14.0–10.0) slurry but rather should be introduced after the slurry is brought to some middle range pH value (e.g., 4.0 to 8.0). It also bears repeating that if a given binder formulation is to contain no catalyst component, it is not necessary to raise (or lower) the pH to a 4.0 to 8.0 pH level by the introduction of phosphate-containing compound(s) such as ammonium phosphate, phosphoric acid etc. Applicant's experimental work also established that the required phosphate content (e.g., 2 to 20 percent, or 0.25 to about 20.0 percent when an auxiliary binder is used) can be introduced into the clay slurry without taking it out of its initial 1.0 to 3.0 pH level. In the same vein, an alkaline system need not be taken from its initial 14.0–10.0 pH level if no catalyst is to be introduced into applicant's alkaline reaction systems.

Applicant's experimental program also established that a phosphate component constituting even as little as 0.25 percent of the end product particles is necessary to the successful practice of all of the herein described processes. Applicant verified this point by replacing a phosphate-providing phosphoric acid ingredient, which alone provided even this small amount of phosphate, with several other kinds of acid. That is to say that applicant tried numerous acids (other than phosphoric) e.g., formic, acetic, hydrochloric and nitric acid in attempts to produce attrition-resistant binders having no phosphate component whatsoever. In all such cases the end results were identical. There was an immediate increase in the viscosity of the clay slurry—just as there is when the phosphoric acid was used—however, upon spray drying and calcination, the resulting end product particles completely disintegrated during attrition testing. From these results applicant has theorized that the attrition-resistant qualities of the herein described matrices is at least in part a result of the formation of a thermally stable, phosphate bond (i.e., this bond withstands the high temperatures associated with applicant's calcination step) between the individual clay particles and the phosphate component of the phosphate-containing compound(s).

The experimental evidence also indicated that yet another end result of using all three of applicant's process steps is the creation of particles which are "encased" in a hard, resilient shell of a vitreous material. That is to say that it appears that these particles have a vitreous shell—as opposed to being vitreous throughout. Indeed, the experimental evidence all points to a need for the conjunctive or combined use of applicant's ingredient proportions, pH conditions and calcination parameters in order to create a species of "glass" out of the clay and phosphate ingredients. Moreover, it appears that this glass formation is in addition to any chemical reactions which form the thermally stable phosphate/clay chemical bond noted above. In other words, if all of applicant's steps are not followed, this "glass" or vitreous shell either does not ultimately form around outside of the binder particle or the binder/catalyst particle; or if a physical (that is, temperature induced) "glassing" of these materials does take place, it produces a glass encasement around the particle which is decidedly inferior with respect to attrition-resistance when compared to those particles produced when all of applicant's process steps are followed. Thus, it appears that not only does applicant's calcination step serve to drive off all volatile matter from the subject particles, it also serves to provide the heat conditions which also are necessary to bring about a "glass forming reaction" between the clay and phosphate molecules, especially near the surface of the particles and this serves to impart an unusually "tough", attrition-resistant quality to the outside surface of those particles.

Applicant's experimental work also suggested that the other "physical" steps, e.g., spray drying, extruding and desiccation are less critical to the overall success of this invention compared to the calcination step. However, the details of these other physical steps cannot be completely disregarded. For example, applicant's spray drying step can be replaced by other drying and forming procedures known to the catalyst production arts (e.g., extrusion procedures) which tend to produce much larger catalyst units (e.g., those sized on the order of about one inch). Again, these larger particles are not well suited for use in "fluid" catalytic system; but, they are very useful when employed in stationary catalyst "beds."

Applicant's overall experimental program also clearly established that in order to obtain good attrition-resistance in the herein disclosed binder matrices or binder/catalyst matrices, it is extremely important to either have a high enough proportion of phosphate-to-clay (2-20 percent phosphate) or to at least augment a low proportion of phosphate (e.g., one providing less than about 2 weight percent to the end product particles) with an auxiliary binder material such as the glue type binder materials previously described. In all cases some phosphate must be present. The minimal requirement is at about 0.25 percent of the weight of the end product particles. That is to say that applicant's experimental work has established that these two "threshold" proportions of phosphate is indeed mandatory for the production of "attrition-resistance" in the binder systems or in binder/catalyst systems which employ naturally occurring clays in proportions greater than about 20 percent.

Applicant's experimental work also established that, in most cases the phosphate component, and especially that provided in percentages less than 2.0 percent of the overall material, is most preferably, at least partially, provided by phosphoric acid. Indeed, as was previously discussed, because the 0.25 weight percent" phosphate requirement seemed to be so very small, applicant conducted an extensive series of tests which, in effect, tried to substitute various other acids such as formic acid, acetic acid, hydrochloric acid and nitric acid for this seemingly small percentage of phosphoric acid. Again, the results of these tests were consistently bad—that is to say that the particles resulting from the use of non-phosphate-providing acids had very poor attrition-resistance qualities.

Other experimental work determined the extent of the various pH ranges which can be used and still obtain good attrition-resistant catalyst. At this point it also might be noted that in the initial stages of the experimental program, applicant posed the hypothesis that if one carried out any "gel reactions" in strongly acidic conditions the results would be poor because virtually all known prior art attempts to produce binder materials by "gel reactions" carried out at strongly acidic pH levels had failed. Applicant then obtained a great deal of experimental data that showed that the introduction of phosphate compounds into a clay slurry at about 5 to 7 pH levels resulted in poor attrition-resistance of the resulting spray dried particles. This fact seemed to be anomalous. Later experimental work indicated that if applicant started with a clay slurry having a low pH (e.g., one created by adding an acid to the slurry) and then added a phosphate-containing compound such as dibasic ammonium phosphate to raise the pH, then binders having high levels of attrition-resistance could be obtained over a very wide pH range. This group of experiments also established that applicant's "gel reaction" were not the same kind of "gel reaction" used in the prior art since they could in fact be carried in acidic conditions which were generally regarded as "anathema" to carrying out most prior art "gel reactions."

In another important group of experiments, applicant added a small amount of phosphoric acid to various clay slurries. This lowered their pH to less than about 2.0. However, it turned out that there was not enough phosphate to meet the subsequently disclosed "minimum requirement" (2-20 percent) of phosphate-to-clay needed to produce attrition-resistant matrices. In a later set of experiments, additional phosphate was supplied by a dibasic ammonium phosphate in order to "adjust the final pH" of the clay slurries. Thus, it was during such attempts to "adjust the pH" that applicant discovered the 2 percent threshold requirements for phosphate in the end products. Thereafter, applicant found that with a little trial and error one could find exactly the "right" amount of acid to add initially, in order that the amount of ammonium phosphate subsequently added will give any predetermined pH with any given amount of phosphate-to-clay. Thereafter, applicant concluded that a bonding effect between the phosphate and the clay was due to the development of a strong charge at the edge of the clay particles.

With this "strong charge" theory in mind, applicant thereafter developed the "alkaline reaction versions" of these processes by using a strong base such as ammonium hydroxide to achieve a high pH level (i.e., 14.0 to 10.0) before adding phosphoric acid (or other mineral acids) and various phosphates such as monobasic ammonium phosphate in order to adjust the pH downward to various lower values (e.g., to pH levels of from 4.0 to 8.0). It also turned out that even organic acids could be used for this pH lowering purpose. It also should be noted in passing that when this alkaline reaction technique was employed, applicant found that he did not have to pay quite as "strict" attention to the order of addition of the various components as in the "acid reaction" versions of the process. That is to say that in these "alkaline reaction" versions there are many cases where the phosphate-containing compound (e.g., monobasic and dibasic ammonium phosphates) and an acid such as phosphoric acid can be added simultaneously without adversely affecting the attrition-resistance of the resulting particles.

Another area investigated by applicant revolved around the question as to why applicant obtained such large improvements in the activity of the various zeolites used in the various clay matrices. A brief review of this line of experiments would probably be helpful to a better overall understanding of the scope of this invention. In one series of experiments, applicant worked with several zeolites, but particularly ZSM-5, in various prior art silica-alumina binder systems. The results thereof were compared to analogous zeolites bound in applicant's binder systems. The results were dramatic—four-fold improvements in activity were often obtained. These results became even more dramatic when it was determined that many of applicant's matrices had pH values of about 2.0. Applicant tried several experimental approaches to link the improvement in catalytic activity solely to the low pH of the clay matrix. These experiments were unsuccessful. Indeed, subsequent experiments established that even better activities were obtained if a matrix had a higher pH. Applicant also found that other zeolites totally unrelated to ZSM-5 responded in much the same way. Indeed, it later turned out that widely varying types of catalysts could be so employed without suffering catalytic activity losses.

An extended experimental program was then directed at trying to understand what all zeolites have in common which made applicant's clay/phosphate matrices interact so favorably with them. To this end, applicant centered a group of experiments around an initial proposition that if a catalyst has a higher activity in a different binder, then that higher activity must be due to one of several factors (or some combination of those factors). For example, applicant explored, by experimental procedures, the proposition that a given matrix may simply provide an environment in which a catalyst particle, e.g., zeolite is more chemically stable. That is to say that applicant conducted various experiments which sought to reduce the chemical interaction between applicant's clay and phosphate components and various zeolite catalyst materials. Applicant also explored the proposition that the reactants are simply more accessible to a catalyst such as a zeolite in one matrix than in another.

In considering these questions, applicant repeatedly observed that all of the active catalyst particles investigated had well defined port openings and were otherwise such that the reactant molecules could diffuse through to reach the active surface of the catalyst. Therefore, the external surface of the catalyst (e.g., a zeolite) and its availability in the matrix were considered to be of extreme importance in determining the activity of a particular catalyst. If part of the surface were blocked in any fashion then there seemed to be an almost proportional loss in activity of the catalyst.

It is with this idea in mind that applicant developed an explanation for the improvements in activity that were observed which seems to be consistent with all of the experimental evidence. This explanation is centered around the idea that the subject zeolite catalyst systems have certain factors in common. For example, zeolite crystals are typically grown to a size of about 0.5 microns. However, one never obtains single crystals. Usually zeolites are agglomerated in rather haphazard ways and in the prior art procedures for processing said zeolites, the agglomerates can grow to an average size of 30 microns. In order to visualize these agglomerates one must view the individual crystals as small blocks that are randomly stacked on top of one another so that larger particles are formed. When one crystal lays on top of another the ports that lead into the interior surface of the zeolite are blocked and there is a concomitant loss of catalytic activity. Moreover, applicant's experimental evidence suggested that there was nothing that applicant's clay matrix systems could do to retrieve this loss.

There is, however, another source of blockage that applicants particular matrices did alleviate. This form of alleviation seems to be related to the fact that the agglomerated particles of zeolite are not simply solid masses of crystals packed tightly together. Indeed, they have pore structures of their own, commonly referred to as a "macropore" systems. Such macropore systems can have openings as large as 1000 Angstroms. Applicant's experimental work indicated that the clay/phosphate matrices formed by applicant's processes cannot enter these macropores since the individual clay particles are typically of the order of 0.25 microns or 2500 Angstroms. Applicant believes that this is the primary reason why such a large improvement in catalytic activity has been maintained in the herein described binder particles. Applicant also believes that these clay/phosphate binders stand apart from other binders in that the pH of applicant's systems can be controlled to any desired value. Thus, applicant's ability to make clay binders having pH levels of from about 1.0 all the way to about 14.0 has great potential value to the catalyst-employing arts.

Moreover, since applicant's binder does not depend on forming a gel from a liquid sol or as a dissolved chemical such as sodium silicate or aluminum sulphate, there is no possibility of blocking the surface ports of the zeolites. These facts are believed to be especially significant when they are compared with the fact that most prior art binder systems have one factor in common. When they are first mixed with a zeolite, they are in the form of a liquid sol or as a dissolved chemical such as sodium silicate or aluminum sulfate. The particles in these sols are about 20 Angstroms in diameter. Hence, they can easily fill the macropores of the zeolite agglomerates. Consequently, when they gel, they tend to block the macropores of the zeolite agglomerates thereby reducing the catalytic activity.

However, the experimental evidence also indicated that the catalytic activity of certain small particulate catalysts such as ZSM-5 could be improved by treating these catalyst particles with one of applicant's phosphate-containing compounds (and especially phosphoric acid). That is to say that zeolites treated in this manner made especially good catalysts for use in applicant's binder systems. Indeed, this enhanced activity was to a large degree maintained in binder systems other than those forming the subject matter of this patent disclosure. Therefore, this method (i.e., exposure of catalysts such as zeolites to phosphate compounds and then using them in non-clay-containing binder systems such as those found in the prior art) of obtaining increased catalytic activity may become the subject matter of a later "continuation-in-part" patent application.

However, be that as it may, the subject matter and scope of the instant patent disclosure will now be further illustrated by the following descriptions of procedures and representative experimental tests.

EXPERIMENTAL METHODS AND RESULTS THEREOF

Procedures

Certain experimental data demonstrating applicant's overall invention will now be summarized. Detailed descriptions of certain specific experiments which provided the data will then be given as examples of the overall processes described herein. To this end, it first should be noted that one widely used "standard" procedure used for preparing applicant's binder systems generally was to add water to a clay slurry and then adjust the clay content thereof to about 40% weight. That is to say that the clays initially employed often contained 70% weight clay and that these were diluted to about a 40% clay concentration with an appropriate liquid media such as water. After the slurry was placed under "extreme" pH conditions, a phosphate compound was added to the slurry, usually under vigorous stirring conditions. The clays, catalysts and phosphates most widely used in applicant's experimental programs were:

| TYPE | RAW MATERIALS SOURCE | GRADE |
|---|---|---|
| CLAYS | | |
| Kaolin Clay | Thiele | Grade RC-32 |
| Kaolin Clay | Georgia Kaolin | Wrens Clay Slurry |
| Kaolin Clay | Thiele | Low Soda Slurry |
| CATALYSTS | | |
| ZSM-5 | Mobil | Mobil No. 1 |
| ZSM-5 | Mobil | ROF |
| REY Zeolite | Conteka | CBV-400 |
| USY Zeolite | PQ | 30-063 |
| PHOSPHATES | | |
| Phosphoric Acid | | 85% $H_3PO_4$ |
| Monobasic Ammonium Phosphate | | 100% $(NH_4)H_2PO_4$ |
| Dibasic Ammonium Phosphate | | 100% $(NH_4)_2HPO_4$ |

Spray Dryer

The spray dryer pump discharge pressures were typically 10-15 PSIG with dead-head pressures in excess of 40 PSIG. Slurries that could be forced into pump suction under such conditions could be conveniently pumped into a dryer.

ATTRITION TEST AN CATALYTIC ACTIVITY

The products of applicant's experimental program were tested by various physical and chemical tests. Two of the most important of these were an attrition measuring test and a catalyst activity measuring test. A brief description of these tests, especially with respect to some particularly important catalyst types will be given by way of example.

The various samples were tested for their resistance to attrition using a proposed ASTM standard test method (ASTM D-32.02.06, Draft Number 5a) for determining the attrition and abrasion resistance of powdered catalysts by air jets. This method is still under evaluation by an ASTM standards committee and has not been accorded the status of an ASTM Test Method. Each test was run on 50 grams of humidified sample. The samples were placed in an attriting tube and run for one hour. At the end of this period the amount of fines collected in a fines collection assembly was determined. The sample was then attrited for an additional hour. At the end of this time the fines in the collection assembly were determined. An "Attrition Index" of the sample was determined as the total fines made less the fines made in the first hour divided by the total weight of the sample less the fines made in the first hour times one hundred. In this particular test, applicant regarded an attrition index of less than seven as being an acceptable material. An index of less than one is indicative of a truly excellent material.

Catalytic Activity Test

The catalytic activities of various catalyst samples were determined by ASTM Method No. 3907-87. The apparatus and operating procedures in this test method were followed in testing the catalysts prepared according to the teachings of this application; however, the operating conditions of the test were modified for the particular type of catalyst being evaluated. These tests were particularly concerned with evaluating two general types of catalyst. The first type were those additives that are combined with other catalysts; typical of these are the ZSM-5 containing catalysts. The second type of catalysts were the FCC catalysts; typical of these are the faujasite containing catalysts. The procedure for determining the activity of these two types of catalysts are detailed in the following sections.

1. Additive Type Catalysts

These catalysts were evaluated by first steam deactivating them and then adding a small quantity, usually 4% by weight, to a standard catalyst. The catalysts were deactivated by flowing a mixture consisting of 55% volume steam and 45% volume air through a bed of catalyst maintained at 1450° F. (790° C.) for ten hours. The "standard" catalyst was then run on the microactivity test at the following nominal conditions:

| | |
|---|---|
| Temperature | 960° F. (515 C.) |
| WHSV, GMS.OIL/HR., GM CAT | 10.0 |
| TIME, SEC | 80.0 |
| GMS. CATALYST | 4.0 |
| GMS. OF OIL | 0.9 |

A complete set of yields was obtained. These included all of the light hydrocarbons from hydrogen up to and including all of C4 hydrocarbons. To the standard catalyst 4% by weight of the steam deactivated catalyst was added and the test was rerun. The activity of the additive was defined as the increase in the volumetric yield of propylene, butylene and isobutane. Typically, the sum of these products was 20.6% by volume for the standard catalyst and 27.6% for the standard catalyst with the additive. Frequently it is necessary to alter the ZSM-5 content of the additive, or to use more or less additive in the test. In this case the activity is defined on the basis of 1% weight ZSM-5. In the example given above, if the catalyst contained 12.5% weight ZSM-5 and 4% weight was mixed with the standard catalyst, the activity would be 14. This method of measuring activity was used with respect to a very wide variety of samples.

Faujasite Catalysts

These catalysts were evaluated for their catalytic activity by first steam deactivating them. The deactivation procedure employed was to flow 100% by volume steam through a bed of the catalyst maintained at 1400° F. (795° C.) for four hours. The nominal operating conditions on the microactivity test were as follows:

| | |
|---|---|
| Temperature | 960° F. (515 C.) |
| WHSV, GMS.OIL/HR, GM. CAT. | 16.0 |
| TIME, SEC. | 80.0 |
| GMS. CATALYST | 3.0 |
| GMS OF OIL | 0.9 |

The activity of the catalyst is defined as 100 minus the percent volume of cracked material boiling above 430° F. This material, referred to as the "cycle oil", is determined by conventional gas liquid chromatography.

Sample Analysis And Data Treatment

The spray dryer discharge samples were typically calcined at 800°-2,000° F. for from about 30 to about 100 minutes. However most of applicant's tests were conducted at 1000° F. for about one hour. Several tests also indicated that temperatures of about 1350° F. are highly preferred. Samples of each spray dryer run were sent to an outside commercial analytical lab for analysis prior to sending them to another outside facility for attrition and density testing.

Discussion of Preferred Materials In View Of Certain Specific Experimental Results Various experimental results indicated that particularly good results were obtained from the conjunctive use of phosphoric acid and one or more other phosphate-containing compounds. For example, in carrying out the experiment described in example 1, phosphoric acid (H3PO4) was added to a dilute (40%) clay slurry and the particulate material that resulted from spray-drying and calcination had an attrition index of 1.0. The pH of the clay slurry, after adding the phosphoric acid, was 1.7. The next step in this particular experiment employed mono-basic ammonium phosphate. The formula for this compound is (NH4)H2PO4; hence one ammonia group has reacted with a hydrogen ion in the acid. In this particular experiment the pH of the resulting slurry was 4.3. The attrition-resistance of the resulting particles was 1.8.

An analogous experiment was made using dibasic ammonium phosphate. the pH of the slurry was 7.7. The attrition resistance of the resulting particles was 1.2. Applicant also did some experiments where the pH of the slurry was adjusted to between 6 and 7 pH by using various mixtures of the above compounds to obtain various pH's. Applicant found that in this range of pH's the resulting particles generally had rather poor resistance to attrition. The results of these experiments are summarized in Table 1.

TABLE 1

| EX-AMPLE | TYPE PO4 | pH | ATTRITION | COMMENTS |
|---|---|---|---|---|
| 1 | ACID | 1.7 | 1 | |
| 2 | MONO | 4.3 | 1.8 | |
| 3 | DI | 7.7 | 1.2 | |
| 4 | DI + ACID | 7 | 19.2 | INIT. pH-7.8 |
| 5 | MONO + BASE | 7 | 8.4 | INIT. pH-6.3 |
| 6 | DI + ACID | 6.5 | 12.8 | INIT. pH-7.3 |

These results are consistent with the observation that the edge surface of kaolinites clays are at there isoelectric point at about pH 7.0. At low pH they may acquire a positive charge and at high pH they may acquire a negative charge. In general, this group of experiments showed that particles with very high attrition-resistance can be made if the clay slurry is initially brought to a low or a high pH. Applicant subsequently found that particles with good attrition-resistance could be made as long as the clay slurry was first brought to a low or a high pH and then adjusted to any intermediate pH. The significant point coming out of this work experimental was that applicant's process gives an ability to use clay, an inert material from a catalytic viewpoint, and use it to great economical advantage in preparing a wide variety of materials useful in the catalytic arts. In addition, applicants processes have the added advantage of giving an ability to control the pH of the media into which the various catalytic components are blended. The advantages of this will be demonstrated in subsequent examples.

After determining the effect of pH on the attrition-resistance of the clay-phosphate particles, applicant then directed his attention to the effect of the amount of phosphate used in the clay. One series of experiments was made with clay and phosphoric acid as the phosphate source. The results of the experiments are summarized in Table 2.

TABLE 2

| EXAMPLE | TYPE PO4 | PO4, % WT | pH | ATTRITION |
|---|---|---|---|---|
| 1 | ACID | 9.8 | 1.7 | 1.0 |
| 7 | ACID | 6.5 | 2.1 | 17.0 |
| 8 | ACID | 3.2 | 2.7 | 3.3 |

These results were "anomalous" in that they show that at about 6.5% weight phosphate the particles demonstrate greatly reduced resistance to attrition. Applicant has observed similar behavior with other experimental preparations at this phosphate concentration. It is theorized that these results show that there are critical concentrations of phosphate in the clay slurry where the phosphate reacts entirely with the clay surface of a single particle and fails to form cross links with adjacent clay particles. The result is that while individual clay particles form a tough vitreous shell they fail to form a bond between particles and the final aggregate has no attrition resistance. The significance of these results is that various clays, depending on their source, may behave somewhat differently from some other clay used. That is to say that the point of minimum attrition cannot always be precisely defined. Applicant normally used clays from East Georgia and these represent some of the largest clay deposits in North America; however as experience was gained with other kaolinites it became evident that somewhat different results will be obtained with the use of different sources of "the same" clay. These data reinforce the idea that we are dealing with naturally-occurring minerals and not precise chemical compounds; and, as a result some variation is to be expected from different clay sources.

Preparation Of Certain Catalyst Matrices

Many commercially available catalysts are comprised of four main components; a faujasite or some other active catalytic material, an amorphous component, a binder material or glue and a filler clay. The binder, the amorphous component and the filler clay are frequently referred to as the matrix of the catalyst. This usage is sometimes employed in this patent application as well.

In any event, in the following examples, applicant will detail certain experimental work which was concerned with using representative binder systems to prepare various catalyst matrices of particular commercial interest. As noted previously these active matrices may in fact act as catalysts in their own right and may indeed be utilized as such. For example one set of experiments considered the use of gel alumina as the amorphous material in a role as a catalyst material. In this particular application the gel alumina could also be considered as an "auxiliary binder." The experimental procedure for preparing the resulting matrix is detailed in Example 9. It shows that the ratio of clay binder to gel alumina was 2-to-1 and that the alumina was dispersed with 0.6 milliequivalent of acetic acid. Dibasic ammonium phosphate was used as the phosphate source. The pH of the clay alumina slurry was 7.3. A matrix with an attrition-resistance of 3.8 was obtained.

By way of further example of the use of amorphous materials were combinations of gel alumina and activated alumina. For example, in Example 8 the composition was 50% clay binder and 50% amorphous material. The amorphous material, in turn, was 50% gel alumina and 50% activated alumina. When dibasic ammonium phosphate was used as the phosphate source a resulting material with an attrition index of 0.8 was obtained. In Example 11 applicant altered the ratio of binder to amorphous material by lowering the amount of gel alumina from 25% to 15%. In this example, monobasic ammonium phosphate was used as the phosphate source; the pH was 6.1 and the attrition-resistance was 1.6. Example 12 was similar to Example 8 except that a mixture of phosphoric acid and monobasic ammonium phosphate was used; the pH was 3.5. The attrition resistance of the matrix was 0.37.

Preparation Of Synthetic Zeolites

As was previously noted, synthetic zeolites comprise a large group of catalytic materials of great interest to commercial operations. The most important zeolite in this group is ZSM-5. In formulating this zeolite into a useful particle it is only necessary to use a clay binder; that is to say that other catalytic components such as amorphous catalysts are not necessary. Examples 13 and 14 describe the preparation of a typical ZSM-5 catalyst using phosphoric acid (Example 14) and dibasic ammonium phosphate (Example 13). Both phosphates result in particles with excellent attrition resistance. However, there are significant differences in the activity of the finished catalysts. This difference in activity demonstrates another significant advantage of applicant's clay-phosphate binder formulation; this is the ability to control the pH of the binder slurry. In Example 14 the pH of the clay - binder - zeolite slurry was 4.0. The activity index of the finished catalyst was 12.7.

In Example 13 the pH of the slurry was 8.0 and the activity of the catalyst was 23.8. This is approximately a two-fold improvement in activity. Applicant believes that at the lower pH some alumina is removed from the structure of the zeolite and this results in lower catalytic activity of the zeolite. However, it also should be noted in passing that the ability of the clay-phosphate binder to provide effective binding at high pH's is a very significant advantage; it also should be noted that all existing commercial binders are only effective at lower pH values of about 2.5 to 4.0.

Example 15 demonstrates the preferred method of preparing the ZSM-5 catalyst. The clay is first brought to a low pH with phosphoric acid and then the pH of the clay slurry is adjusted to 7.3 with dibasic ammonium phosphate; the ZSM-5 zeolite is added at this point. The activity and attrition results with this method are similar to those obtained in Example 13. The critical point is that the ZSM-5 zeolite not contact the low pH ($<4.0$) clay - phosphate slurry.

Preparation Of Faujasite Catalysts

The faujasite group of zeolites are by far the most important catalysts in petroleum cracking operations. In such operations, zeolites are generally combined with one or more amorphous catalysts in the same particle. In some of applicant's experiments, applicant chose a gel alumina as the amorphous component and rare earth exchanged Y (REY) as the faujasite. The details of such a preparation are given in Example 16. The phosphate source was dibasic ammonium phosphate and the gel alumina was prepared by dispersing it in 0.5 milliequivalent of nitric acid per gram of alumina. The pH of the final slurry was 6.9. the activity of the finished catalyst was 77.3. Example 17 gives the details of a preparation in which phosphoric acid was used as phosphate source. The low pH of the clay-phosphate slurry caused extensive damage to the REY zeolite and the resulting activity was 15.8. This low activity indicates almost total destruction of the zeolite. However it also should be noted that there are many zeolites in the faujasite group that will be unaffected by the pH of the binder. It also should be pointed out that typical zeolite would be the ultra stable Y zeolites (USY). The reason for this is that the zeolites have been dealuminated by high temperature steaming and controlled acid leaching. After their preparation many of these zeolites are stable to boiling mineral acids. Example 18 gives the details of a preparation of a USY catalyst.

Applicant has theorized that one of the major factor that accounts for the large improvements in the activity of the catalysts made with the clay-phosphate matrix is that there is no liquid sol to fill the macropores of the zeolite particles. This makes more of the surface ports of the zeolite crystals accessible to reactants. To demonstrate this point applicant prepared a common type of commercially available FCC catalyst using a conventional binder. The details of this preparation are given in Example 19. The binder was a gel alumina peptized with formic acid; the faujasite was a mixture of Y zeolite and comprised 25% weight of the catalyst. A filler clay was used and this comprised 50% of the catalyst. The attrition resistance of the catalyst was 7.0; the activity was 80.

Example 20 gives the details of making a similar catalyst using a clay-phosphate binder. The faujasite components were the same as in Example 16. An activated alumina was substituted for the alumina gel. The matrix was prepared by using dibasic ammonium phosphate with the clay. The finished catalyst had an attrition index of 0.8; a very significant improvement over the conventional catalyst. The activity was 85 which is also a very large improvement in activity.

SELECT EXPERIMENTS

Example 1

This example describes the preparation of a clay-phosphate binder using phosphoric acid as the phosphate source. In this preparation 1436 grams of a 70% weight kaolin clay slurry were diluted to 40% weight by adding 947 milliliters of water. The resulting mixture was stirred at high speed in a Waring blender. The 70% clay slurry is a commercial grade material designated as Thiele Grade RC-32. To the diluted slurry, 117 grams of phosphoric acid of 85% concentration was added while continuing to mix at a high speed. The pH of the slurry was 1.7. There was an immediate increase in the viscosity of the slurry. The slurry was spray dried to produce a particle with an average size of 65 microns. The spray-dried product was calcined in air for one hour at 1000° F. The calcined particles were then tested for their resistance to attrition and found to have an attrition index of 1.0.

Example 2

This example describes the preparation of a clay-phosphate binder using monobasic ammonium phosphate as the phosphate source. In this preparation 1681 grams of a 70% weight kaolin clay slurry were diluted to 40% weight by adding 1176 milliliters of water. The resulting mixture was stirred at high speed in a Waring blender. The 70% clay slurry is a commercial grade material designated as Thiele Grade RC-32. To the diluted slurry, 29.4 grams of monobasic ammonium phosphate dissolved in 100 milliliters of water was added while continuing to mix at a high speed. The pH of the slurry was 4.3. There was an immediate increase in the viscosity of the slurry. The slurry was spray dried to produce a particle with an average size of 65 microns. The spray dried product was calcined in air for one hour at 1000° F. The calcined particles were then tested for their resistance to attrition and found to have an attrition index of 1.8.

Example 3

This example describes the preparation of a clay-phosphate binder using dibasic ammonium phosphate as the phosphate source. In this preparation 1681 grams of a 70% weight kaolin clay slurry were diluted to 40% weight by adding 1176 milliliters of water. The resulting mixture was stirred at high speed in a Waring blender. The 70% clay slurry is a commercial grade material designated as Thiele Grade RC-32. To the diluted slurry, 35 grams of dibasic ammonium phosphate dissolved in 100 milliliters of water was added while continuing to mix at a high speed. The pH of the slurry was 7.7. There was an immediate increase in the viscosity of the slurry. The slurry was spray dried to produce a particle with an average size of 65 microns. The spray dried product was calcined in air for one hour at 1000° F. The calcined particles were then tested for their resistance to attrition and found to have an attrition index of 1.2.

Example 4

This example describes the preparation of a clay-phosphate binder using dibasic ammonium phosphate plus phosphoric acid as the phosphate source. In this preparation 1637 grams of a 70% weight kaolin clay slurry were diluted to 40% weight by adding 727 milliliters of water. The resulting mixture was stirred at high speed in a Waring blender. The 70% clay slurry is a commercial grade material designated as Thiele Grade RC-32. To the diluted slurry, 34 grams of dibasic ammonium phosphate in a 25% weight solution in water was added while continuing to mix at a high speed. There was an immediate increase in the viscosity of the slurry. The pH of the slurry was 7.8. To this mixture, 11.2 grams of 85% phosphoric acid was added. The pH dropped to 7.0. It was necessary to add an additional 550 milliliters of water to the slurry to reduce the viscosity. The slurry was spray dried to produce a particle with an average size of 65 microns. The spray dried product was calcined in air for one hour at 1000.F. The calcined particles were then tested for their resistance to attrition and found to have an attrition index of 19.2.

Example 5

This example describes the preparation of a clay-phosphate binder using monobasic ammonium phosphate as the phosphate source. In this preparation 1639 grams of a 70% weight kaolin clay slurry were diluted to 40% weight by adding 717 milliliters of water. The resulting mixture was stirred at high speed in a Waring blender. The 70% clay slurry is a commercial grade material designated as Thiele Grade RC-32. To the diluted slurry, 34 gams of monobasic ammonium phosphate in a 25% weight solution in water was added while continuing to mix at a high speed. There was an immediate increase in the viscosity of the slurry. The pH of the slurry was 6.3. To this mixture 18 milliliters of concentrated ammonium hydroxide were added. The pH increased to 7.0. The slurry was spray dried to produce a particle with an average size of 65 microns. The spray dried product was calcined in air for one hour at 1000° F. The calcined particles were then tested for their resistance to attrition and found to have an attrition index of 8.4.

Example 6

This example describes the preparation of a clay-phosphate binder using dibasic ammonium phosphate plus phosphoric acid as the phosphate source. In this preparation 1637 grams of a 70% weight kaolin clay slurry were diluted to 40% weight by adding 727 milliliters of water. The resulting mixture was stirred at high speed in a Waring blender. The 70% clay slurry is a commercial grade material designated as Thiele Grade RC-32. To the diluted slurry, 34 grams of dibasic ammonium phosphate in a 25% weight solution in water was added while continuing to mix at a high speed. There was an immediate increase in the viscosity of the slurry. The pH of the slurry was 7.3. To this mixture 23.6 grams of 85% phosphoric acid were added. The pH dropped to 6.5. The slurry was spray dried to produce a particle with an average size of 65 microns. The spray dried product was calcined in air for one hour at 1000° F. The calcined particles were then tested for their resistance to attrition and found to have an attrition index of 12.8.

Example 7

This example describes the preparation of a clay-phosphate binder using phosphoric acid as the phosphate source. In this preparation 1550 grams of a 70% weight kaolin clay slurry were diluted to 40% weight by adding 872 milliliters of water. The resulting mixture was stirred at high speed in a Waring blender. The 70% clay slurry is a commercial grade material designated as Thiele Grade RC-32. To the diluted slurry, 78 grams of phosphoric acid of 85% concentration was added while continuing to mix at a high speed. The pH of the slurry was 2.1. There was an immediate increase in the viscosity of the slurry. The slurry was spray dried to produce a particle with an average size of 65 microns. The spray-dried product was calcined in air for one hour at 1350° F. The calcined particles were then tested for their resistance to attrition and found to have an Attrition Index of 17.

Example 8

This example describes the preparation of a clay-phosphate binder using phosphoric acid as the phosphate source. In this preparation 1615 grams of a 70% weight kaolin clay slurry were diluted to 40% weight by adding 846 milliliters of water. The resulting mixture was stirred at high speed in a Waring blender. The 70% clay slurry is a commercial grade material designated as Thiele Grade RC-32. To the diluted slurry, 39 grams of phosphoric acid of 85% concentration was added while continuing to mix at a high speed. The pH of the slurry was 2.7. There was an immediate increase in the viscosity of the slurry. The slurry was spray dried to produce a particle with an average size of 65 microns. The spray-dried product was calcined in air for one hour at 1350° F. The calcined particles were then tested for their resistance to attrition and found to have an Attrition Index of 3.3.

Example 9

This example describes the preparation of a particle containing an amorphous catalyst formed into an attrition resistant material using a clay-phosphate binder. The amorphous catalyst was a gel alumina obtained from Condea Chemie as is designated Pural SB. It was prepared for inclusion into the binder by dispersing a 26.5% weight alumina slurry in water in 0.5 milliequivalent of acetic acid per gram of alumina. The clay binder was prepared by diluting 1121 grams of a 70% weight kaolin clay slurry with 479 milliliters of water in a Waring blender. To the diluted clay 31.4 grams of dibasic ammonium phosphate dissolved in 100 milliliters of water were added to the clay slurry. There was an immediate increase in the viscosity of the clay slurry. The dispersed alumina slurry was added to the clay slurry plus 500 milliliters of water to reduce the viscosity. The pH of the resulting mixture was 7.3. The slurry was spray dried to produce a particle of approximately 65 microns. The spray-dried product was calcined in air for one hour at 1000° F. The calcined particles were then tested for their resistance to attrition and found to have an Attrition Index of 3.8.

Example 10

This example describes the preparation of a particle containing an amorphous catalyst formed into an attrition resistant material using a clay-phosphate binder. The amorphous catalyst was a combination of a gel alumina and an activated alumina. The gel alumina was obtained from Condea Chemie as is designated Pural SB; the activated alumina was obtained from Alcoa chemical company and was designated grade CP 1.5. The gel alumina was prepared for inclusion into the binder by dispersing a 30% weight alumina slurry in water in 0.5 milliequivalent of acetic acid per gram of alumina. The activated alumina was prepared by slurrying 250 grams of it in 464 milliliters of water. The clay binder was prepared by diluting 840 grams of a 70% weight kaolin clay slurry with 470 milliliters of water in a Waring blender. To the diluted clay 17.5 grams of dibasic ammonium phosphate dissolved in 50 milliliters of water were added to the clay slurry. There was an immediate increase in the viscosity of the clay slurry. The dispersed alumina slurry was added to the clay slurry, followed by the activated alumina slurry. The pH of the resulting mixture was 8.0. The slurry was spray dried to produce a particle of approximately 65 microns. The spray-dried product was calcined in air for one hour at 1000° F. The calcined particles were then tested for their resistance to attrition and found to have an Attrition Index of 0.8.

Example 11

This example describes the preparation of a particle containing an amorphous catalyst formed into an attrition resistant material using a clay-phosphate binder. The amorphous catalyst was a combination of a gel alumina and an activated alumina. The gel alumina was obtained from Condea Chemie as is designated Pural SB; the activated alumina was obtained from Alcoa chemical company and was designated grade CP 1.5. The gel alumina was prepared for inclusion into the binder by dispersing a 20% weight alumina slurry in water in 0.5 milliequivalent of nitric acid per gram of alumina. The activated alumina was prepared by slurrying 250 grams of it in 464 milliliters of water. The clay binder was prepared by diluting 1008 grams of a 70% weight kaolin clay slurry with 1507 milliliters of water in a Waring blender. To the diluted clay 96 grams of monobasic ammonium phosphate dissolved in 150 milliliters of water were added to the clay slurry. There was an immediate increase in the viscosity of the clay slurry. The dispersed alumina slurry was added to the clay slurry, followed by the activated alumina slurry. The pH of the resulting mixture was 6.1. The slurry was spray dried to produce a particle of approximately 65 microns. The spray-dried product was calcined in air for one hour at 1000° F. The calcined particles were then tested for their resistance to attrition and found to have an Attrition Index of 1.6.

Example 12

This example describes the preparation of a particle containing an amorphous catalyst formed into an attrition resistant material using a clay-phosphate binder. The amorphous catalyst was a combination of a gel alumina and an activated alumina. The gel alumina was obtained from Condea Chemie as is designated Pural SB; the activated alumina was obtained from Alcoa chemical company and was designated grade CP 1.5. The gel alumina was prepared for inclusion into the binder by dispersing a 20% weight alumina slurry in water in 0.5 milliequivalent of nitric acid per gram of alumina. The activated alumina was prepared by slurrying 250 grams of it in 464 milliliters of water. The clay binder was prepared by diluting 1008 grams of a 70% weight kaolin clay slurry with 1507 milliliters of water in a Waring blender. To the diluted clay 48 grams of monobasic ammonium phosphate dissolved in 100 milliliters of water plus 48 grams of 85% phosphoric acid were added to the clay slurry. There was an immediate increase in the viscosity of the clay slurry. The dispersed alumina slurry was added to the clay slurry, followed by the activated alumina slurry. The pH of the resulting mixture was 3.5. The slurry was spray dried to produce a particle of approximately 65 microns. The spray-dried product was calcined in air for one hour at 1000° F. The calcined particles were then tested for their resistance to attrition and found to have an Attrition Index of 0.37.

Example 13

This example describes the preparation of a particle containing a synthetic zeolitic catalyst formed into an attrition resistant material using a clay-phosphate binder. The synthetic zeolite is a ZSM-5 type catalyst obtained from Mobil Chemical Corporation. The clay binder was prepared by diluting 1432 grams of a 70% weight kaolin clay slurry with 342 milliliters of water in a Waring blender. To the diluted clay 34 grams of dibasic ammonium phosphate in a 25% weight water solution were added to the clay slurry. There was an immediate increase in the viscosity of the clay slurry. The ZSM-5 zeolite was slurried in water; the solids content of the slurry was 31.6% weight. The pH of the resulting mixture was 6.4. The slurry was spray dried to produce a particle of approximately 65 microns. The spray dried product was calcined in air for one hour at 1000° F. The calcined particles were then tested for their resistance to attrition and found to have an Attrition Index of 1.6. The catalyst was also tested for activity after steam deactivation and found to have an Activity Index of 23.8.

Example 14

This example describes the preparation of a particle containing a synthetic zeolitic catalyst formed into an attrition resistant material using a clay-phosphate binder. The synthetic zeolite is a ZSM-5 type catalyst obtained from Mobil Chemical Corporation. The clay binder was prepared by diluting 1374 grams of a 70% weight kaolin clay slurry with 342 milliliters of water in a Waring blender. To the diluted clay 121 grams of 85% phosphoric acid were added to the clay slurry. There was an immediate increase in the viscosity of the clay slurry. The ZSM-5 zeolite was slurried in water; the solids content of the slurry was 18.6% weight. The pH of the resulting mixture was 4.0. The slurry was spray dried to produce a particle of approximately 65 microns. The spray dried product was calcined in air for one hour at 1000° F. The calcined particles were then tested for their resistance to attrition and found to have an Attrition Index of 1.2. The catalyst was also tested for activity after steam deactivation and found to have an Activity Index of 12.7.

Example 15

This example describes the preparation of a particle containing a synthetic zeolitic catalyst formed into an attrition-resistant material using a clay-phosphate binder. The synthetic zeolite is a ZSM-5 type catalyst obtained from Mobil Chemical Corporation. The clay binder was prepared by diluting 1586 grams of a 60% weight kaolin slurry with 650 milliliters of water in a Waring blender. To the diluted clay 19 grams of 85% weight phosphoric acid were added. There was an immediate increase in the viscosity of the slurry and the pH dropped to 2.4. To the acidified clay slurry 350 grams of a 40% weight solution of dibasic ammonium phosphate was added. The pH increased to 7.42. The ZSM-5 zeolite was prepared by slurrying 63 grams in water; the solids content of the slurry was 26.0% weight. This slurry was added to the clay slurry and mixed in the Waring blender. The pH of the mixture was 7.3. The slurry was spray dried to produce a particle of approximately 65 microns. The spray dried particles were calcined in air for one hour at 1350° F. The calcined particles were then tested for their resistance to attrition and found to have an Attrition Index of 4.4. the catalyst was also tested for activity after steam deactivation and found to have an Activity Index of 24.

Example 16

This example describes the preparation of a particle containing a faujasite catalyst combined with an amorphous catalyst and formed into an attrition resistant material using a clay-phosphate binder. The amorphous catalyst was a gel alumina obtained from Condea Chemie and designated Pural SB. The alumina was prepared for inclusion into the binder by dispersing a 20% weight alumina slurry in water in 0.5 milliequivalent of nitric acid per gram of alumina. The clay binder was prepared by diluting 1146 grams of a 70% weight kaolin clay slurry with 736 milliliters of water; 200 grams of REY zeolite was added to the clay slurry and mixed at high speed in a Waring blender. To the clay-REY slurry, 24 grams of dibasic ammonium phosphate dissolved in 75 milliliters of water were added. There was an immediate increase the viscosity of the slurry. The dispersed alumina was added to the slurry. The pH of the mixture was 6.9. The slurry was spray dried to produce a particle of approximately 65 microns. The spray-dried product was calcined in air for one hour at 1000° F. The calcined particles were then tested for their resistance to attrition and found to have an Attrition Index of 1.5. The catalyst was also tested for activity after steam deactivation and found to have an Activity Index of 77.3.

Example 17

This example describes the preparation of a particle containing a faujasite zeolite catalyst formed into an attrition resistant material using a clay-phosphate binder. The faujasite zeolite is a rare earth exchanged Y-faujasite. The clay binder was prepared by diluting 1416 grams of a 70% weight kaolin clay slurry with 585 milliliters of water in a Waring blender. To the diluted clay 339 grams of a slurry containing 44% REY was added and mixed at high speed. To this slurry 114 grams of 85% phosphoric acid was added. There was an immediate increase in the viscosity of the slurry. The pH of the resulting mixture was 4.0. The slurry was spray dried to produce a particle of approximately 65 microns. The spray dried product was calcined in air for one hour at 1000° F. The calcined particles were then tested for their resistance to attrition and found to have an Attrition Index of 1.1. The catalyst was also tested for activity after steam deactivation and found to have an Activity Index of 15.8.

Example 18

This example describes the preparation of a particle containing a faujasite zeolite catalyst formed into an attrition resistant material using a clay-phosphate binder. The faujasite zeolite is a ultra stable Y-faujasite. The clay binder was prepared by diluting 852 grams of a 70% weight kaolin clay slurry with 1500 milliliters of water in a Waring blender. To the diluted clay 250 grams of ultra stable Y-faujasite was added and mixed at high speed. To this slurry 98 grams of 85% phosphoric acid was added. There was an immediate increase in the viscosity of the slurry. The pH of the resulting mixture was 3.0. The slurry was spray dried to produce a particle of approximately 65 microns. The spray dried product was calcined in air for one hour at 1000° F. The calcined particles were then tested for their resistance to attrition and found to have an Attrition Index of 1.5. The catalyst was also tested for activity after steam deactivation and found to have an Activity Index of 68.2.

Example 19

This example describes the preparation of a particle containing a faujasite zeolite catalyst formed into an attrition resistant material using a conventional alumina gel binder. The faujasite component was a mixture of a high rare earth exchanged Y-faujasite and a low rare earth exchanged Y-faujasite. The alumina gel was prepared by slurrying 167 grams of Condea SB alumina in 1083 milliliters of water and peptizing it with 34 milliliters of formic acid. The faujasite component which totaled 125 grams on a dry basis were slurried along with 294 grams of clay in 600 milliliters of water. This slurry was mixed at high speed in a Waring blender; to this mixture the alumina gel was added. The slurry was spray dried to produce a particle of approximately 65 microns. The spray dried particles were calcined at 1350° F. The calcined particles were then tested for their resistance to attrition and found to have an Attrition Index of 7.0. The catalyst was also tested for activity after steam deactivation and found to have an Activity index of 80.

Example 20

This example describes the preparation of a particle containing a faujasite zeolite catalyst formed into an attrition resistant material using a clay phosphate binder. The faujasite component was a mixture of a high rare earth exchanged Y-faujasite and a low rare earth Y-faujasite. The faujasite components which totaled 250 grams on a dry basis were slurried with 125 grams of Alcoa CP-1.5 activated alumina in 1350 milliliters of water. To this slurry 980 grams of 60% weight clay slurry was added. The mixture was stirred at high speed in a Waring blender. A solution weighing 85.3 grams containing 25% weight dibasic ammonium phosphate was added to the slurry. there was an immediate increase in the viscosity of the slurry. The pH of the slurry was 8.2. the slurry was spray dried to produce a particle of approximately 65 microns. The spray dried particles were calcined at 1350° F. The calcined particles were then tested for their resistance to attrition and found to have an Attrition Index of 0.8. The catalyst was tested for activity after steam deactivation and found to have an activity Index of 85.

The first four experiments used in establishing the data shown in TABLE 1 were made with a commercially available, calcined, delaminated clay e.g., ASTRA PLATE®sold by Georgia Kaolin, Inc. The last experiment was made with a delaminated clay that applicant calcined at 1600F for one hour. The calcining lowered the surface area of the clay from 16 to 4 square meters per gram. Note that incorporating the delaminated clay into the matrix did not have any significant effect on the Attrition Index of the finished matrix. The procedure for preparing a representative material is given in Example 22.

Example 21

This example describes the preparation of a clay-phosphate matrix using delaminated clay. The delaminated clay was obtained from the Thiele Clay Company; its hold under the trademark designation Kaoplate ®. The matrix was prepared by adding 612 grams of Kaoplate slurry to a Waring blender. To the slurry 350 milliliters of water was added followed by 70 grams of phosphoric acid. The mixture was stirred at high speed in the blender for two minutes. The resulting slurry was spray dried. The spray dried material was then calcined at 1000° F. for one hour. The resulting particles had a packed density of 0.80 grams per milliliter and an attrition index of 1.4. Applicant's experimental work also established that mixtures of delaminated and calcined clays and regular clays i.e., those which have not been delaminated or calcined—can be employed in all proportions. However, the best are generally obtained when high proportions (e.g., at least 50%) of delaminated and calcined clays (e.g., up to 100% of said clays) are employed.

Example 22

This example describes the preparation of a clay-phosphate matrix to which calcined delaminated clay was added to improve the particle density. One hundred grams of delaminated clay was calcined for one hour at 1600° F. The calcined clay had a surface area of four square meters per gram. This was added to 1290 milliliters of water along with 1348 grams of Thiele RC-32 ® clay slurry and 119 grams of phosphoric acid. The mixture was stirred at high speed in a Waring blender for two minutes. The resulting slurry was spray dried. The spray dried material was then calcined at 1000° F. for one hour. The resulting particles had a packed density of 0.87 grams per milliliter and an attrition index of 1.4

TABLE 1

| CLAY DENSITY % WT GMS/CC | PHOSPHORIC ACID % WT | ATTRITION INDEX |
|---|---|---|
| 90.2 .770 | 9.8 | 1.5 |
| 80.2 .837 | 9.8 | 1.5 |
| 65.2 .866 | 9.8 | 1.5 |
| 40.2 .853 | 9.8 | 1.4 |

TABLE 1-continued

| CLAY DENSITY % WT GMS/CC | PHOSPHORIC ACID % WT | ATTRITION INDEX |
|---|---|---|
| 80.2 .872 | 9.8 | 1.4 |

Finally, those skilled in this art also will appreciate that the conditions employed in the herein described processes will be those appropriate to the particular materials being used. As was previously noted, some variations may be introduced as a result of using clays from different mineral sources. In any case, while this invention generally has been described in terms of the general discussions, specific examples and preferred embodiments, none of these should be taken individually as a limit upon the overall inventive concepts described herein.

Thus having disclosed this invention, What is claimed is:

1. A process for preparing attrition-resistant binder particles, said process comprising:
   (1) preparing a clay slurry having from about 20 to about 50 weight percent delaminated and calcined clay;
   (2) adjusting the pH of the clay slurry to a level which places an aluminum component of the clay in an oxidation state which is conducive to formation of an ammonium/aluminum/phosphate complex;
   (3) providing the clay slurry with ammonium ions and with phosphate ions by introducing therein an ammonium phosphate compound selected from the group consisting of monoammonium acid orthophosphate, diammonium acid ortho phosphate and triammonium ortho-phosphate and thereby producing a clay slurry having ammonium aluminum phosphate complex units in a quantity such that the attrition-resistant binder particles ultimately made from the slurry will be comprised of from about 1 to about 20 weight percent phosphate and from about 80 to about 99 weight percent clay;
   (4) drying the slurry to produce solid particles; and
   (5) calcining said solid particles in order to produce attrition-resistant binder particles.

2. The process of claim 1 wherein the phosphate ions are partially provided by introducing phosphoric acid into the slurry.

3. The process of claim 1 wherein the phosphate ions are supplied by a mixture of monoammonium acid orthophosphate and diammonium acid orthophosphate.

4. The process of claim 1 wherein the phosphate ions are supplied by a mixture of phosphoric acid and an ammonium phosphate compound selected from the group consisting of monoammonium acid orthophosphate, diammonium acid orthophosphate and triammonium ortho phosphate.

5. The process of claim 1 wherein an additional ingredient comprising up to about 10 weight percent of the attrition-resistant binder particles is placed in the clay slurry in place of a portion of a clay portion of said slurry.

6. The process of claim 1 wherein the clay is kaolin clay.

7. The process of claim 1 which further comprises desiccating the particles resulting from the drying at a temperature higher than the boiling point of a liquid medium used to create the clay slurry for a period from about 0.2 hours to about 24.0 hours in order to remove any residual amounts of the liquid medium and thereby obtaining, in the form of a powder, anhydrous particles.

8. The process of claim 1 wherein the calcining is carried out in a temperature range between about 1,000 degrees Fahrenheit and about 1,950 degrees Fahrenheit for from about 60 minutes to about 240 minutes.

9. The process of claim 1 wherein additional amounts of a liquid medium are added to a concentrated clay/water slurry in order to bring the slurry's clay concentration to about 40 weight percent.

10. The process of claim 1 wherein the phosphate ions provide from about 6.0 to about 12.0 weight percent of phosphate to the attrition-resistant binder material.

11. The process of claim 1 wherein the calcining is accomplished in a catalytic unit which employs the attrition-resistant binder particles.

12. A process for preparing attrition-resistant clay/phosphate/catalyst particles, said process comprising:
  (1) preparing a clay slurry having from about 20 to about 50 weight percent delaminated and calcined clay;
  (2) adjusting the pH of the clay slurry to a level which places an aluminum component of the clay in an oxidation state which is conducive to formation of an ammonium aluminum phosphate complex;
  (3) providing the clay slurry with ammonium ions and with phosphate ions by introducing therein an ammonium phosphate compound selected from the group consisting of monoammonium acid orthophosphate, diammonium acid ortho phosphate and triammonium ortho-phosphate and thereby producing a clay slurry having ammonium aluminum phosphate complex units in a quantity such that the attrition-resistant binder particles ultimately made from the slurry will be comprised of from about 1 to about 20 weight percent phosphate and from about 80 to about 99 weight percent clay;
  (4) mixing catalyst particles into the clay/phosphate-containing compound slurry to form a clay/phosphate-containing compound/catalyst particle slurry having a quantity of catalyst particles which is such that the attrition-resistant clay/phosphate/catalyst particles made from said slurry will comprise from about 3 to about 60 weight percent of said particles;
  (5) drying the slurry to produce solid particles; and
  (6) calcining said solid particles in order to produce attrition-resistant clay/phosphate/catalyst particles.

13. The process of claim 12 wherein the phosphate ions are partially provided by introducing phosphoric acid into the slurry.

14. The process of claim 12 wherein the phosphate ions are supplied by a mixture of monoammonium acid orthophosphate and diammonium acid orthophosphate.

15. The process of claim 12 wherein the phosphate ions are supplied by a mixture of phosphoric acid and an ammonium phosphate compound selected from the group consisting of monoammonium acid orthophosphate, diammonium acid orthophosphate and triammonium ortho phosphate.

16. The process of claim 12 wherein the clay is kaolin clay.

17. The process of claim 12 which further comprises desiccating the particles resulting from the drying at a temperature higher than the boiling point of a liquid medium used to create the clay slurry for a period from about 0.2 hours to about 24.0 hours in order to remove any residual amounts of the liquid medium and thereby obtaining, in the form of a powder, anhydrous particles.

18. The process of claim 12 wherein the calcining is carried out in a temperature range between about 1,000 degrees Fahrenheit and about 1,950 degrees Fahrenheit for from about 60 minutes to about 240 minutes.

19. The process of claim 12 wherein additional amounts of a liquid medium are added to a concentrated clay/water slurry in order to bring the slurry's clay concentration to about 40 weight percent.

20. The process of claim 12 wherein the phosphate ions provide from about 6.0 to about 12.0 weight percent of phosphate to the attrition-resistant binder material.

21. The process of claim 12 wherein the calcining is accomplished in a catalytic unit which employs the attrition-resistant binder particles.

22. The process of claim 12 wherein the adjustment of the pH of the clay slurry also serves to produce a pH level which preserves catalytic activity of catalyst particles in the attrition-resistant clay/phosphate/catalyst particles.

23. The process of claim 12 wherein the adjustment of the pH of the clay slurry is achieved through the use of a mixture of monoammonium acid ortho phosphate and diammonium acid orthophosphate.

24. The process of claim 12 wherein the adjustment of the pH of the clay slurry is achieved through the use of a mixture of monoammonium acid ortho phosphate, diammonium acid orthophosphate and phosphoric acid.

25. The process of claim 12 wherein the production of the ammonium aluminum phosphate complex units in the clay slurry is followed by a second pH adjustment which produces a pH of from about 4.0 to about 8.0 and thereby prepares the clay slurry to receive catalyst particles without causing diminished catalytic activity in said catalyst particles.

26. A process for preparing attrition-resistant binder particles, said process comprising:
  (1) preparing a clay slurry having from about 20 to about 50 weight percent delaminated and calcined clay;
  (2) bringing the clay slurry to a pH of from about 1.0 to about 3.0;
  (3) mixing a phosphate-containing compound into the clay slurry to form a clay/phosphate-containing compound slurry having a quantity of the phosphate-containing compound which is such that the attrition-resistant binder particles ultimately made from the clay/phosphate-containing compound slurry will be comprised of from about 2 to about 20 weight percent phosphate and from about 80 to about 98 weight percent clay;
  (4) drying the clay/phosphate-containing compound slurry to produce solid particles; and
  (5) calcining said solid particles in order to produce attrition-resistant binder particles.

27. The process of claim 25 wherein the drying of the clay/phosphate slurry is accomplished by spray drying said slurry.

28. The process of claim 25 wherein the phosphate-containing compound is selected from the group consisting of a monobasic phosphate compound, a dibasic phosphate compound or a tribasic phosphate compound.

29. The process of claim 25 wherein the phosphate-containing compound is selected from the group consisting of monobasic ammonium phosphate, dibasic ammonium phosphate and phosphoric acid.

30. The process of claim 25 wherein the phosphate-containing compound is provided by a mixture of monobasic ammonium phosphate and dibasic ammonium phosphate.

31. The process of claim 25 wherein mixing the phosphate-containing compound into the clay slurry brings the clay slurry to a pH of from about 4.0 to about 8.0.

32. The process of claim 25 wherein an additional ingredient comprising up to about 10 weight percent of the attrition-resistant binder particles is placed in the clay slurry in place of a portion of a clay portion of said slurry.

33. The process of claim 25 wherein the clay is kaolin clay.

34. The process of claim 25 which further comprises desiccating the particles resulting from the drying at a temperature higher than the boiling point of a liquid medium used to create the clay slurry for a period from about 0.2 hours to about 24.0 hours in order to remove any residual amounts of the liquid medium and thereby obtaining, in the form of a powder, anhydrous particles.

35. The process of claim 25 wherein the calcining is carried out in a temperature range between about 1,000 degrees Fahrenheit and about 1,950 degrees Fahrenheit for from about 60 minutes to about 240 minutes.

36. The process of claim 25 wherein additional amounts of a liquid medium are added to a concentrated clay/water slurry in order to bring the slurry's clay concentration to about 40 weight percent.

37. The process of claim 25 wherein the quantity of phosphate-containing compound provides from about 6.0 to about 12.0 weight percent of phosphate to the attrition-resistant binder material.

38. The process of claim 25 wherein the calcining is accomplished in a catalytic unit which employs the attrition-resistant binder particles.

39. A process for preparing attrition-resistant clay/phosphate/catalyst particles, said process comprising:
  (1) preparing a clay slurry having from about 20 to about 50 weight percent delaminated and calcined clay;
  (2) bringing the clay slurry to a pH of from about 1.0 to about 3.0;
  (3) mixing a phosphate-containing compound into the clay slurry to form a clay/phosphate-containing compound slurry which has sufficient phosphate to form a clay/phosphate-containing compound slurry having a pH from about 4.0 to about 8.0 and provide a quantity of phosphate which is such that the clay/phosphate/catalyst particles ultimately made from said slurry will be comprised of from about 2 to about 20 weight percent phosphate;
  (4) mixing catalyst particles into the clay/phosphate-containing compound slurry to form a clay/phosphate-containing compound/catalyst particle slurry having a quantity of catalyst particles which is such that the attrition-resistant clay/phosphate/catalyst particles made from said slurry will comprise from about 3 to about 60 weight percent of said particles;
  (5) drying said clay/phosphate-containing compound/catalyst particle slurry to produce solid particles; and
  (6) calcining said solid particles to produce attrition-resistant clay/phosphate/catalyst particles which comprise from about 3 to about 60 weight percent of the catalyst particles, from about 2 to about 20 weight percent of phosphate and from about 20 to about 95 weight percent clay.

40. The process of claim 39 wherein the drying of the clay/phosphate-containing compound slurry is accomplished by spray drying said slurry.

41. The process of claim 39 wherein the phosphate-containing compound is selected from the group consisting of a monobasic phosphate compound, a dibasic phosphate compound or a tribasic phosphate compound.

42. The process of claim 39 wherein the phosphate-containing compound is selected from the group consisting of monobasic ammonium phosphate, dibasic ammonium phosphate and phosphoric acid.

43. The process of claim 39 wherein the phosphate-containing compound is provided by a mixture of monobasic ammonium, phosphate, dibasic ammonium phosphate and phosphoric acid.

44. The process of claim 39 wherein the bringing of the clay slurry to a pH of from 14.0 to about 10.0 is accomplished by introducing ammonium hydroxide into the clay slurry.

45. The process of claim 39 wherein an additional ingredient comprising up to about 10 percent of the attrition-resistant binder particles is placed in the clay slurry in place of a portion of a clay portion of said slurry.

46. The process of claim 39 wherein the clay component is a kaolin clay.

47. The process of claim 39 which further comprises desiccating the particles resulting from the spray drying at a temperature higher than the boiling point of the liquid medium for a period from about 0.2 hours to about 24.0 hours in order to remove any residual amounts of the liquid medium and thereby obtaining, in the form of a powder, anhydrous particles.

48. The process of claim 39 wherein the calcining is carried out in a temperature range between about 1,000 degrees Fahrenheit and about 1,950 degrees Fahrenheit for from about 60 minutes to about 240 minutes.

49. The process of claim 39 wherein the catalyst particles comprise about 25 weight percent of the clay/phosphate/catalyst particles.

50. The process of claim 39 wherein the quantity of phosphate-containing compound provides from about 6.0 to about 12.0 weight percent of phosphate to the attrition-resistant binder material.

51. The process of claim 39 wherein a viscosity agent selected from the group consisting of starch and gum arabic is added to the slurry before it undergoes spray drying.

52. A process for preparing attrition-resistant clay/phosphate/catalyst particles, said process comprising:
  (1) preparing a clay slurry having from about 20 to about 50 weight percent delaminated and calcined clay;
  (2) bringing the clay slurry to a pH of from about 14.0 to about 10.0;
  (3) mixing a phosphate-containing compound into the clay slurry to form a clay/phosphate-containing compound slurry having a quantity of phosphate which is such that the attrition-resistant binder particles ultimately made from the slurry will be comprised of from about 2 to about 20 weight percent of phosphate and from about 80 to about 98 weight percent clay;

(4) drying the clay/phosphate-containing slurry to produce solid particles;

(5) calcining said solid particles in order to produce attrition-resistant binder particles.

53. The process of claim 52 wherein the drying of the clay/phosphate/catalyst slurry is accomplished by spray drying said slurry.

54. The process of claim 52 wherein the phosphate-containing compound is selected from the group consisting of a monobasic phosphate compound, a dibasic phosphate compound or a tribasic phosphate compound.

55. The process of claim 52 wherein the phosphate-containing compound is selected from the group consisting of monobasic ammonium phosphate, dibasic ammonium phosphate and phosphoric acid.

56. The process of claim 52 wherein the phosphate-containing compound is provided by a mixture of monobasic ammonium phosphate, dibasic ammonium phosphate and phosphoric acid.

57. The process of claim 52 wherein the bringing of the clay slurry to a pH of from 14.0 to about 10.0 is accomplished by introducing ammonium hydroxide acid into said clay slurry.

58. The process of claim 52 wherein the clay component is a kaolin clay.

59. The process of claim 52 which further comprises desiccating the particles resulting from the, spray drying at a temperature higher than the boiling point of the liquid medium for a period from about 0.2 hours to about 24.0 hours in order to remove any residual amounts of the liquid medium and thereby obtaining, in the form of a powder, anhydrous particles.

60. The process of claim 52 wherein the mixing of the phosphate-containing compound into the clay slurry brings the clay slurry to a pH of from about 4.0 to about 8.0

61. The process of claim 57 wherein the calcining is accomplished in a catalytic unit which employs the attrition-resistant binder particles.

62. The process of claim 52 wherein an additional ingredient comprising up to about 10 percent of the attrition-resistant binder particles in place of a portion of a clay portion of said slurry.

63. The process of claim 52 wherein a viscosity agent selected from the group consisting of starch and gum arabic is added to the slurry before it undergoes spray drying.

64. A process for preparing attrition-resistant clay/phosphate/catalyst particles, said process comprising:

(1) preparing a clay slurry having from about 20 to about 50 weight percent delaminated and calcined clay;

(2) bringing the clay slurry to a pH of from about 14.0 to about 10.0;

(3) mixing a phosphate-containing compound and an auxiliary binder material (which collectively constitute an auxiliary binder component of the attrition-resistant binder particles) into the clay slurry to form a clay/phosphate-containing compound/auxiliary binder material slurry having a quantity of auxiliary binder component which is such that the attrition-resistant binder particles ultimately made from the clay/phosphate-containing compound/auxiliary binder material slurry will be comprised of from about 5.25 to about 60 weight percent of the auxiliary binder component and from about 40 to about 94.75 weight percent of a clay component and wherein said auxiliary binder component contains an amount of phosphate which is sufficient to provide the attrition-resistant binder particles with at least about 0.25 weight percent phosphate;

(4) drying the clay/phosphate/auxiliary binder material slurry to produce solid particles; and (5) calcining said solid particles to produce attrition-resistant binder particles.

65. The process of claim 64 wherein the drying of the clay/phosphate slurry is accomplished by spray drying said slurry.

66. The process of claim 64 wherein the phosphate-containing compound is selected from the group consisting of a monobasic phosphate compound, a dibasic phosphate compound or a tribasic phosphate compound.

67. The process of claim 64 wherein the phosphate-containing compound is selected from the group consisting of monobasic ammonium phosphate, dibasic ammonium phosphate and phosphoric acid.

68. The process of claim 64 wherein the phosphate-containing compound is provided by a mixture of monobasic ammonium phosphate and dibasic ammonium phosphate.

69. The process of claim 64 wherein the auxiliary binder material is selected from the group consisting of alumina, silica, alumino-silicate compounds, magnesia, silica-magnesia, chromia, zirconia, gallium and germanium.

70. The process of claim 64 wherein the bringing of the clay slurry to a pH of from 10.0 to about 14.0 is at least partially accomplished by introducing ammonium hydroxide into the clay slurry.

71. The process of claim 64 wherein the clay component is a kaolin clay.

72. The process of claim 64 which further comprises desiccating the particles resulting from the spray drying at a temperature higher than the boiling point of the liquid medium for a period from about 0.2 hours to about 24.0 hours in order to remove any residual amounts of the liquid medium and thereby obtaining, in the form of a powder, anhydrous particles the binder material.

73. The process of claim 64 wherein the calcining is carried out in a temperature range between about 1,000 degrees Fahrenheit and about 1,950 degrees Fahrenheit for from about 60 minutes to about 240 minutes.

74. The process of claim 64 wherein additional amounts of a liquid medium are added to a concentrated clay/water slurry in order to bring the slurry's clay concentration to about 40 weight percent.

75. The process of claim 64 wherein introduction of the phosphate-containing compound brings the slurry to a pH of from about 4.0 to about 8.0.

76. The process of claim 64 wherein a viscosity agent selected from the group consisting of starch and gum arabic is added to the slurry before it undergoes spray drying.

77. A process for preparing attrition-resistant binder particles, said process comprising:

(1) preparing a clay slurry having from about 20 to about 50 weight percent delaminated and calcined clay;

(2) bringing the clay slurry to a pH of from about 14.0 to about 10.0;

(3) mixing a phosphate-containing compound, an auxiliary binder material (which will collectively constitute an auxiliary binder component of the attrition-resistant binder particles) and an acid into the clay slurry which are collectively sufficient to form a clay/phosphate-containing compound/auxiliary binder material/acid slurry having a quantity of phosphate which is such that the attrition-resistant binder particles ultimately made from said slurry will be compressed of from about 5.25 to about 40 weight percent of an auxiliary binder component and from about 40 to about 94.75 weight percent clay and wherein said auxiliary binder component contains sufficient phosphate to make the attrition-resistant binder particles comprise at least about 0.25 weight percent phosphate;

(4) drying the clay/phosphate-containing compound slurry to produce solid particles; and (5) calcining said solid particles to produce attrition-resistant binder particles.

78. The process of claim 77 wherein the drying of the clay/phosphate-containing compound/auxiliary binder component slurry is accomplished by spray drying said slurry.

79. The process of claim 77 wherein the phosphate-containing compound is selected from the group consisting of a monobasic phosphate compound, a dibasic phosphate compound or a tribasic phosphate compound.

80. The process of claim 77 wherein the phosphate-containing compound is selected from the group consisting of monobasic ammonium phosphate, dibasic ammonium phosphate and phosphoric acid.

81. The process of claim 77 wherein the phosphate-containing compound is provided by a mixture of monobasic ammonium phosphate and dibasic ammonium phosphate.

82. The process of claim 77 wherein the bringing of the clay slurry to a pH of from 14.0 to about 10.0 is accomplished by introducing phosphoric acid into the clay slurry.

83. The process of claim 77 wherein the clay is a naturally occurring clay.

84. The process of claim 77 wherein the clay component is a kaolin clay.

85. The process of claim 77 which further comprises desiccating the particles resulting from the spray drying at a temperature higher than the boiling point of the liquid medium for a period from about 0.2 hours to about 24.0 hours in order to remove any residual amounts of the liquid medium and thereby obtaining, in the form of a powder, anhydrous particles.

86. The process of claim 77 wherein the calcining is carried out in a temperature range between about 1,000° degrees Fahrenheit and about 1,950° degrees Fahrenheit for from about 60 minutes to about 240 minutes.

87. The process of claim 77 wherein additional amounts of a liquid medium are added to a concentrated clay/water slurry in order to bring the slurry's clay concentration to about 40 weight percent.

88. The process of claim 77 wherein a gas evolution agent is added to the total mixture before said mixture undergoes spray drying.

89. The process of claim 77 wherein a viscosity agent selected from the group consisting of starch and gum arabic is added to the slurry before it undergoes spray drying.

90. A process for preparing attrition-resistant clay/phosphate/auxiliary binder material/catalyst particles, said process comprising:

(1) preparing a clay slurry having from about 20 to about 50 weight percent delaminated and calcined clay;

(2) bringing the clay slurry to a pH of from about 10.0 to about 14.0;

(3) mixing a phosphate-containing compound and an auxiliary binder material (which will collectively constitute an auxiliary binder component of the attrition-resistant clay/phosphate/auxiliary binder material/catalyst matrix particles) into the clay slurry in an amount which is such that the clay/phosphate/auxiliary binder material/catalyst particles produced from said slurry will be comprised of from about 5.0 to about 40 weight percent of the auxiliary binder component and wherein said auxiliary binder component contains an amount of phosphate which is sufficient to provide the attrition-resistant clay/phosphate/auxiliary binder material/catalyst particles with at least about 0.25 weight percent phosphate;

(4) mixing a sufficient amount of catalyst particles into the clay/phosphate-containing/auxiliary binder material slurry to form a clay/phosphate-containing compound/auxiliary binder material/catalyst particle slurry which has a quantity of catalyst particles which is such that the attrition-resistant clay/phosphate/auxiliary binder material/catalyst matrix particles ultimately made from this process will comprise from about 3 to about 60 weight percent of said catalyst particles;

(5) drying said clay/phosphate compound/catalyst particle slurry to produce solid particles;

(6) calcining the solid particles to produce attrition-resistant clay/phosphate/auxiliary binder material/catalyst particles which comprise between about 3 and about 60 percent by weight of the catalyst particles, between about 20 and about 91.75 weight percent clay and between about 5.25 and about 40 percent auxiliary binder component and wherein said auxiliary binder component contains sufficient phosphate-containing compound to make the attrition-resistant clay/phosphate/auxiliary binder material/catalyst particles comprise at least about 0.25 weight percent phosphate.

91. The process of claim 90 wherein the drying of the clay/phosphate/auxiliary binder component/catalyst slurry is accomplished by spray drying said slurry.

92. The process of claim 90 wherein the phosphate-containing compound is selected from the group consisting of a monobasic phosphate compound, a dibasic phosphate compound or a tribasic phosphate compound.

93. The process of claim 90 wherein the phosphate-containing compound is selected from the group consisting of monobasic ammonium phosphate, dibasic ammonium phosphate and phosphoric acid.

94. The process of claim 90 wherein the phosphate-containing compound is provided by a mixture of monobasic ammonium phosphate and dibasic ammonium phosphate.

95. The process of claim 90 wherein the bringing of the clay slurry to a pH of from 10.0 to about 14.0 is at least partially accomplished by introducing ammonium hydroxide into the clay slurry.

96. The process of claim 90 wherein the clay component is a kaolin clay.

97. The process of claim 90 which further comprises desiccating the particles resulting from the spray drying at a temperature higher than the boiling point of the liquid medium for a period from about 0.2 hours to about 24.0 hours in order to remove any residual amounts of the liquid medium and thereby obtaining, in the form of a powder, anhydrous particles the binder material.

98. The process of claim 90 wherein the calcining is carried out in a temperature range between about 1,000° degrees Fahrenheit and about 1,950° degrees Fahrenheit for from about 60 minutes to about 240 minutes.

99. The process of claim 90, wherein additional amounts of a liquid medium are added to a concentrated clay/water slurry in order to bring the slurry's clay concentration to about 40 weight percent.

100. The process of claim 90 wherein a viscosity agent selected from the group consisting of starch and gum arabic is added to the slurry before it undergoes spray drying.

101. Attrition-resistant binder particles, made by a process comprising:
 (1) preparing a clay slurry having from about 20 to about 50 weight percent delaminated and calcined clay;
 (2) adjusting the pH of the clay slurry to a level which places an aluminum component of the clay in an oxidation state which is conducive to formation of an ammonium/aluminum/phosphate complex;
 (3) providing the clay slurry with ammonium ions and with phosphate ions by introducing therein an ammonium phosphate compound selected from the group consisting of monoammonium acid orthophosphate, diammonium acid ortho phosphate and triammonium ortho-phosphate and thereby producing a clay slurry having ammonium aluminum phosphate complex units in a quantity such that the attrition-resistant binder particles ultimately made from the slurry will be comprised of from about 1 to about 20 weight percent phosphate and from about 80 to about 99 weight percent clay;
 (4) drying the slurry to produce solid particles; and
 (5) calcining said solid particles in order to produce attrition-resistant binder particles.

102. Attrition-resistant clay/phosphate/catalyst particles, made by a process comprising:
 (1) preparing a clay slurry having from about 20 to about 50 weight percent clay delaminated and calcined clay;
 (2) adjusting the pH of the clay slurry to a level which places an aluminum component of the clay in an oxidation state which is conducive to formation of an ammonium aluminum phosphate complex;
 (3) providing the clay slurry with ammonium ions and with phosphate ions by introducing therein an ammonium phosphate compound selected from the group consisting of monoammonium acid orthophosphate, diammonium acid ortho phosphate and triammonium ortho-phosphate and thereby producing a clay slurry having ammonium aluminum phosphate complex units in a quantity such that the attrition-resistant binder particles ultimately made from the slurry will be comprised of from about 1 to about 20 weight percent phosphate and from about 80 to about 99 weight percent clay;
 (4) mixing catalyst particles into the clay/phosphate-containing compound slurry to form a clay/phosphate-containing compound/catalyst particle slurry having a quantity of catalyst particles which is such tat the attrition-resistant clay/phosphate/catalyst particles made from said slurry will comprise from about 3 to about 60 weight percent of said particles;
 (5) drying the slurry to produce solid particles; and
 (6) calcining said solid particles in order to produce attrition-resistant clay/phosphate/catalyst particles.

103. Attrition-resistant binder particles, made by a process comprising:
 (1) preparing a clay slurry having from about 20 to about 50 weight percent delaminated and calcined clay;
 (2) bringing the clay slurry to a pH of from about 1.0 to about 3.0;
 (3) mixing a phosphate-containing compound into the clay slurry to form a clay/phosphate-containing compound slurry having a quantity of the phosphate-containing compound which is such that the attrition-resistant binder particles ultimately made from the clay/phosphate-containing compound slurry will be comprised of from about 2 to about 20 weight percent phosphate and from about 80 to about 98 weight percent clay;
 (4) drying the clay/phosphate-containing compound slurry to produce solid particles; and
 (5) calcining said solid particles in order to produce attrition-resistant binder particles.

104. Attrition-resistant clay/phosphate/catalyst particles, made by a process comprising:
 (1) preparing a clay slurry having from about 20 to about 50 weight percent delaminated and calcined clay;
 (2) bringing the clay slurry to a pH of from about 1.0 to about 3.0;
 (3) mixing a phosphate-containing compound into the clay slurry to form a clay/phosphate-containing compound slurry which has sufficient phosphate to form a clay/phosphate-containing compound slurry having a pH from about 4.0 to about 8.0 and provide a quantity of phosphate which is such that the clay/phosphate/catalyst particles ultimately made from said slurry will be comprised of from about 2 to about 20 weight percent phosphate;
 (4) mixing catalyst particles into the clay/phosphate-containing compound slurry to form a clay/phosphate-containing compound/catalyst particle slurry having a quantity of catalyst particles which is such that the attrition-resistant clay/phosphate/catalyst particles made from said slurry will comprise from about 3 to about 60 weight percent of said particles;
 (5) drying said clay/phosphate-containing compound/catalyst particle slurry to produce solid particles; and
 (6) calcining said solid particles to produce attrition-resistant clay/phosphate/catalyst particles which comprise from about 3 to about 60 weight percent of the catalyst particles, from about 2 to about 20 weight percent of phosphate and from about 20 to about 95 weight percent clay.

105. Attrition-resistant clay/phosphate/catalyst particles, made by a process comprising:
   (1) preparing a clay slurry having from about 20 to about 50 weight percent delaminated and calcined clay;
   (2) bringing the clay slurry to a pH of from about 14.0 to about 10.0;
   (3) mixing a phosphate-containing compound into the clay slurry to form a clay/phosphate-containing compound slurry having a quantity of phosphate which is such that the attrition-resistant binder particles ultimately made from the slurry will be comprised of from about 2 to about 20 weight percent of phosphate and from about 80 to about 98 weight percent clay;
   (4) drying the clay/phosphate-containing slurry to produce solid particles;
   (5) calcining said solid particles in order to produce attrition-resistant binder particles.

106. Attrition-resistant clay/phosphate/catalyst particles, made by a process comprising:
   (1) preparing a clay slurry having from about 20 to about 50 weight percent delaminated and calcined clay;
   (2) bringing the clay slurry to a pH of from about 14.0 to about 10.0;
   (3) mixing a phosphate-containing compound and an auxiliary binder material (which collectively constitute an auxiliary binder component of the attrition-resistant binder particles) into the clay slurry to form a clay/phosphate-containing compound/auxiliary binder material slurry having a quantity of auxiliary binder component which is such that the attrition-resistant binder particles ultimately made from the clay/phosphate-containing compound/auxiliary binder material slurry will be comprised of from about 5.25 to about 60 weight percent of the auxiliary binder component and from about 40 to about 94.75 weight percent of a clay component and wherein said auxiliary binder component contains an amount of phosphate which is sufficient to provide the attrition-resistant binder particles with at least about 0.25 weight percent phosphate;
   (4) drying the clay/phosphate/auxiliary binder material slurry to produce solid particles; and
   (5) calcining said solid particles to produce attrition-resistant binder particles.

107. Attrition-resistant binder particles, made by a process comprising:
   (1) preparing a clay slurry having from about 20 to about 50 weight percent delaminated and calcined clay;
   (2) bringing the clay slurry to a pH of from about 14.0 to about 10.0;
   (3) mixing a phosphate-containing compound, an auxiliary binder material (which will collectively constitute an auxiliary binder component of the attrition-resistant binder particles) and an acid into the clay slurry which are collectively sufficient to form a clay/phosphate-containing compound/auxiliary binder material/acid slurry having a quantity of phosphate which is such that the attrition-resistant binder particles ultimately made from said slurry will be comprised of from about 5.25 to about 40 weight percent of an auxiliary binder component and from about 40 to about 94.75 weight percent clay and wherein said auxiliary binder component contains sufficient phosphate to make the attrition-resistant binder particles comprise at least about 0.25 weight percent phosphate;
   (4) drying the clay/phosphate-containing compound slurry to produce solid particles; and
   (5) calcining said solid particles to produce attrition-resistant binder particles.

108. Attrition-resistant clay/phosphate/auxiliary binder material/catalyst particles, made by a process comprising:
   (1) preparing a clay slurry having from about 20 to about 50 weight percent delaminated and calcined clay;
   (2) bringing the clay slurry to a pH of from about 10.0 to about 14.0;
   (3) mixing a phosphate-containing compound and an auxiliary binder material (which will collectively constitute an auxiliary binder component of the attrition-resistant clay/phosphate/auxiliary binder material/catalyst matrix particles) into the clay slurry in an amount which is such that the clay/phosphate/auxiliary binder material/catalyst particles produced from said slurry will be comprised of from about 5.0 to about 40 weight percent of the auxiliary binder component and wherein said auxiliary binder component contains an amount of phosphate which is sufficient to provide the attrition-resistant clay/phosphate/auxiliary binder material/catalyst particles with at least about 0.25 weight percent phosphate;
   (4) mixing a sufficient amount of catalyst particles into the clay/phosphate-containing/auxiliary binder material slurry to form a clay/phosphate-containing compound/auxiliary binder material/catalyst particle slurry which has a quantity of catalyst particles which is such that the attrition-resistant clay/phosphate/auxiliary binder material/catalyst matrix particles ultimately made from this process will comprise from about 3 to about 60 weight percent of said catalyst particles;
   (5) drying said clay/phosphate compound/catalyst particle slurry to produce solid particles;
   (6) calcining the solid particles to produce attrition-resistant clay/phosphate/auxiliary binder material/catalyst particles which comprise between about 3 and about 60 percent by weight of the catalyst particles, between about 20 and about 91.75 weight percent clay and between about 5.25 and about 40 percent auxiliary binder component and wherein said auxiliary binder component contains sufficient phosphate-containing compound to make the attrition-resistant clay/phosphate/auxiliary binder material/catalyst particles comprise at least about 0.25 weight percent phosphate.

* * * * *